US012709681B2

(12) United States Patent
Delebecq et al.

(10) Patent No.: US 12,709,681 B2
(45) Date of Patent: Aug. 18, 2026

(54) RUBBER COMPOSITION FOR DYNAMIC OR STATIC APPLICATIONS, PROCESS FOR PREPARING SAME AND PRODUCTS INCORPORATING SAME

(71) Applicant: HUTCHINSON, Paris (FR)

(72) Inventors: Etienne Delebecq, Amilly (FR); Laina Guo, Montargis (FR)

(73) Assignee: Hutchinson, Paris (FR)

( * ) Notice: Subject to any disclaimer, the term of this patent is extended or adjusted under 35 U.S.C. 154(b) by 820 days.

(21) Appl. No.: 17/606,991

(22) PCT Filed: Apr. 22, 2020

(86) PCT No.: PCT/FR2020/050684

§ 371 (c)(1),
(2) Date: Oct. 27, 2021

(87) PCT Pub. No.: WO2020/225498

PCT Pub. Date: Nov. 12, 2020

(65) Prior Publication Data

US 2022/0204743 A1 Jun. 30, 2022

(30) Foreign Application Priority Data

May 3, 2019 (FR) ..................................... 19 04690

(51) Int. Cl.

| | |
|---|---|
| ***C08L 23/32*** | (2006.01) |
| ***B60R 13/06*** | (2006.01) |
| ***C08K 3/013*** | (2018.01) |
| ***C08K 3/04*** | (2006.01) |
| ***C08K 3/06*** | (2006.01) |
| ***C08K 3/22*** | (2006.01) |
| ***C08K 5/14*** | (2006.01) |
| ***C08L 7/00*** | (2006.01) |
| ***C08L 9/00*** | (2006.01) |
| ***C08L 21/00*** | (2006.01) |
| ***C08L 23/16*** | (2006.01) |
| ***C08L 83/04*** | (2006.01) |
| ***C09K 3/10*** | (2006.01) |
| ***E04B 1/66*** | (2006.01) |

(52) U.S. Cl.

CPC .............. *C08L 23/32* (2013.01); *B60R 13/06* (2013.01); *C08K 3/013* (2018.01); *C08K 3/04* (2013.01); *C08K 3/06* (2013.01); *C08K 5/14* (2013.01); *C08L 7/00* (2013.01); *C08L 9/00* (2013.01); *C08L 21/00* (2013.01); *C08L 23/16* (2013.01); *C08L 83/04* (2013.01); *C09K 3/10* (2013.01); *E04B 1/66* (2013.01); *C08K 2003/2296* (2013.01); *C08L 2312/00* (2013.01); *C09K 2200/0642* (2013.01)

(58) Field of Classification Search

CPC .. C08L 23/32; C08L 9/00; C08L 23/16; C08L 21/00; C08L 7/00; C08L 83/04; C08L 2312/00; C08K 3/013; C08K 3/04; C08K 3/06; C08K 5/14; C08K 2003/2296; C09K 3/10; C09K 2200/0642; B60R 13/06; E04B 1/66

See application file for complete search history.

(56) References Cited

U.S. PATENT DOCUMENTS

| | | | | |
|---|---|---|---|---|
| 6,036,800 | A * | 3/2000 | Corvasce | C08L 21/00 152/209.4 |
| 2002/0022700 | A1 * | 2/2002 | Chino | C08F 8/30 524/436 |
| 2015/0325830 | A1 | 11/2015 | Li et al. | |
| 2018/0282531 | A1 | 10/2018 | Belin et al. | |

FOREIGN PATENT DOCUMENTS

| | | | | |
|---|---|---|---|---|
| JP | H0741605 | A | 2/1995 | |
| JP | 2893103 | B2 * | 5/1999 | |
| JP | 2001002865 | A | 1/2001 | |
| JP | 2002155148 | A | 5/2002 | |
| JP | 2003049023 | A | 2/2003 | |
| JP | 2003246886 | A | 9/2003 | |
| JP | 6350509 | B2 | 7/2018 | |
| JP | 2018135454 | A | 8/2018 | |
| WO | WO-2014142959 | A1 * | 9/2014 | C08G 18/06 |

OTHER PUBLICATIONS

Machine English translation of JP 2893103, Brook et al., May 17, 1999.*

The English translation of the Chinese Office Action, mailed on May 5, 2023, in the related Chinese Appl. No. 202080041633.0.

The English translation of the International Search Report, mailed on Oct. 15, 2020, in the corresponding PCT Appl. No. PCT/FR2020/050684.

* cited by examiner

*Primary Examiner* — Patrick D Niland

(57) ABSTRACT

The invention relates in particular to a crosslinkable rubber composition and to a process for preparing same.

The composition is based on an elastomer, comprises a crosslinking system and a thermoplastic phase with melting point Tm dispersed as nodules, and comprises the product:

a) of a melt reaction by thermomechanical working of the elastomer and other ingredients, apart from the system, then b) of mechanical working with prior addition of the system.

According to the invention:

the dimension of the nodules is between 10 nm and 10 pm, a) comprises heating the mixture up to a temperature >Tm maintained for a holding time, and the system comprises sulfur when the elastomer is unsaturated and said phase comprises saturated chains, and comprises a peroxide when the elastomer is saturated.

21 Claims, 22 Drawing Sheets

[Fig. 1]
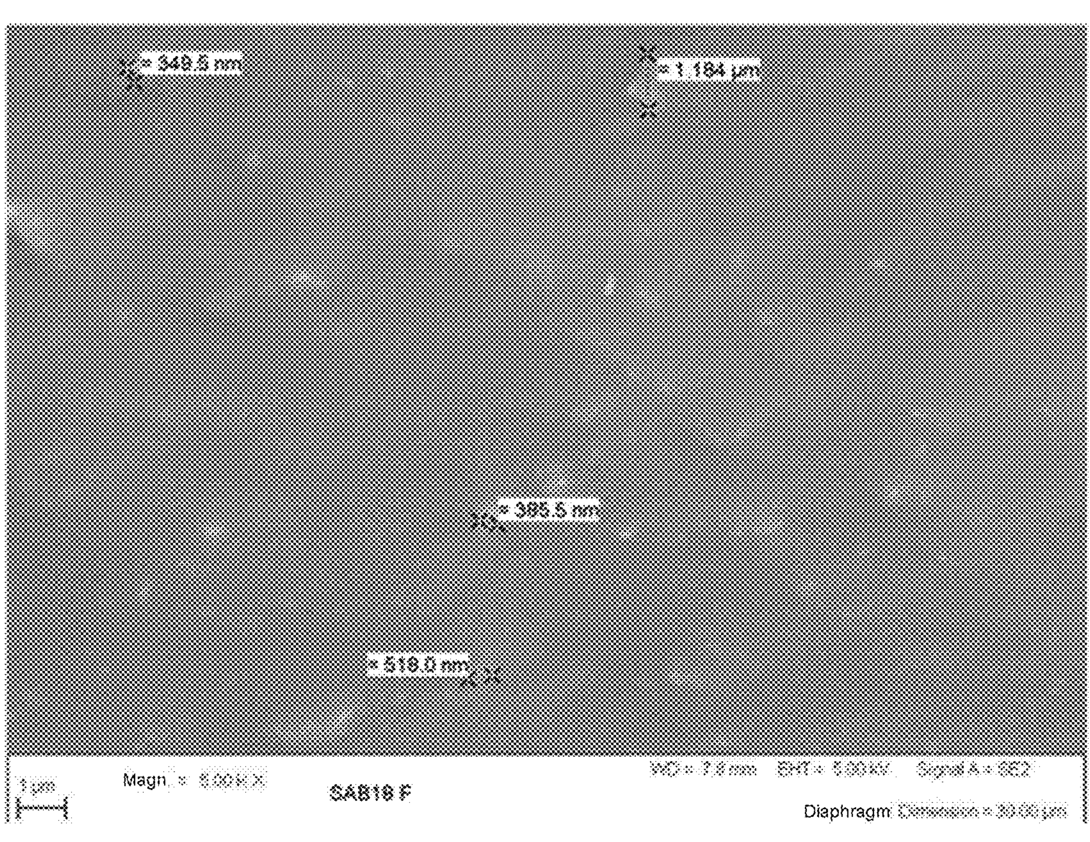

[Fig. 2]
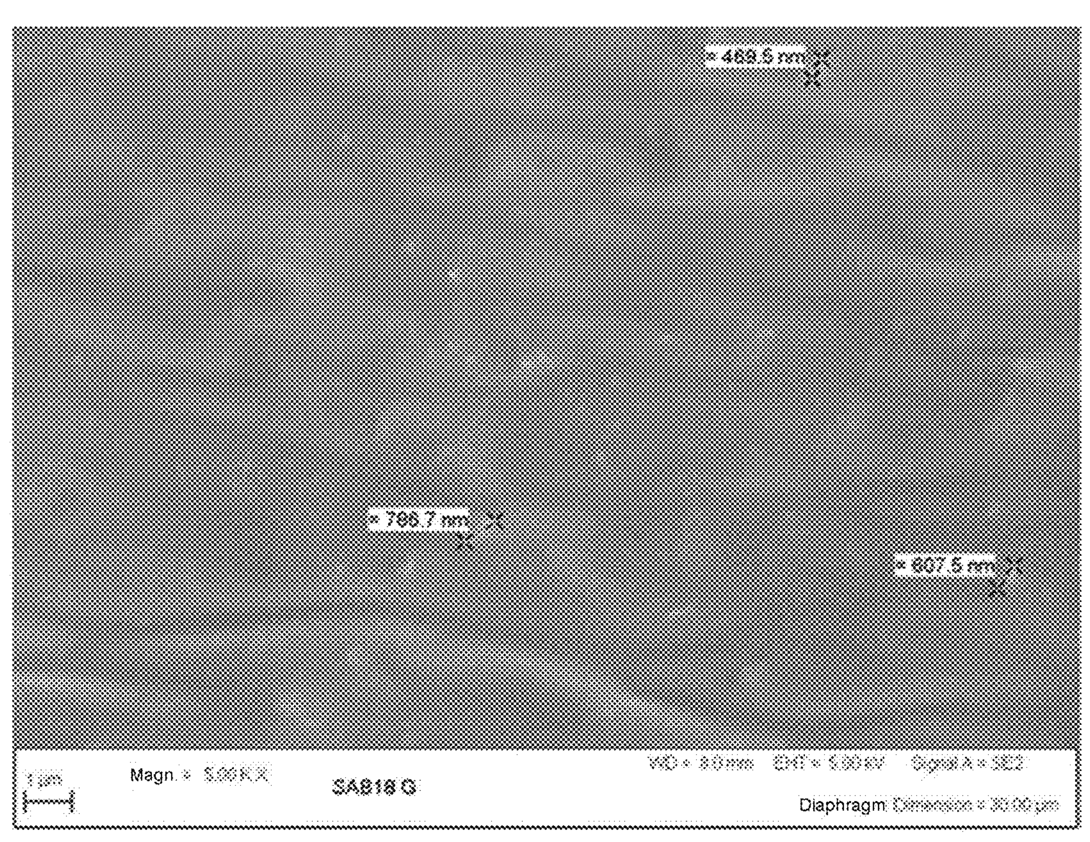

[Fig. 3]
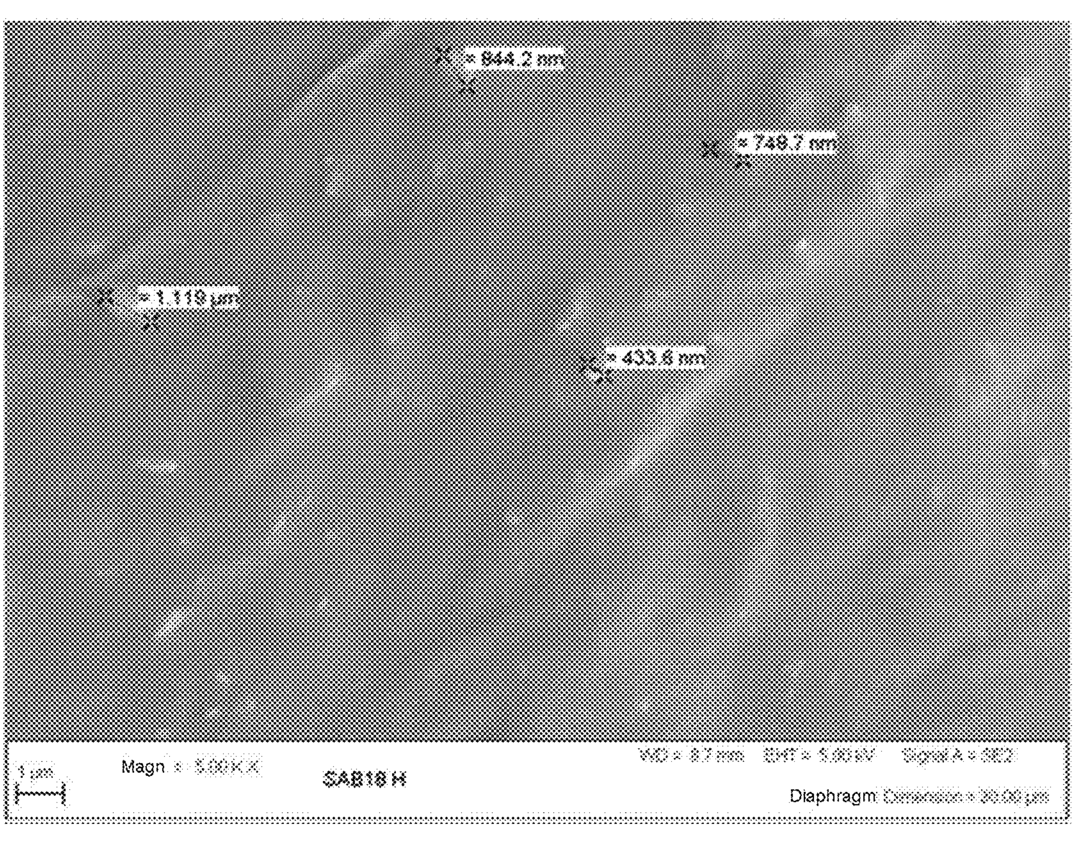

[Fig. 4]
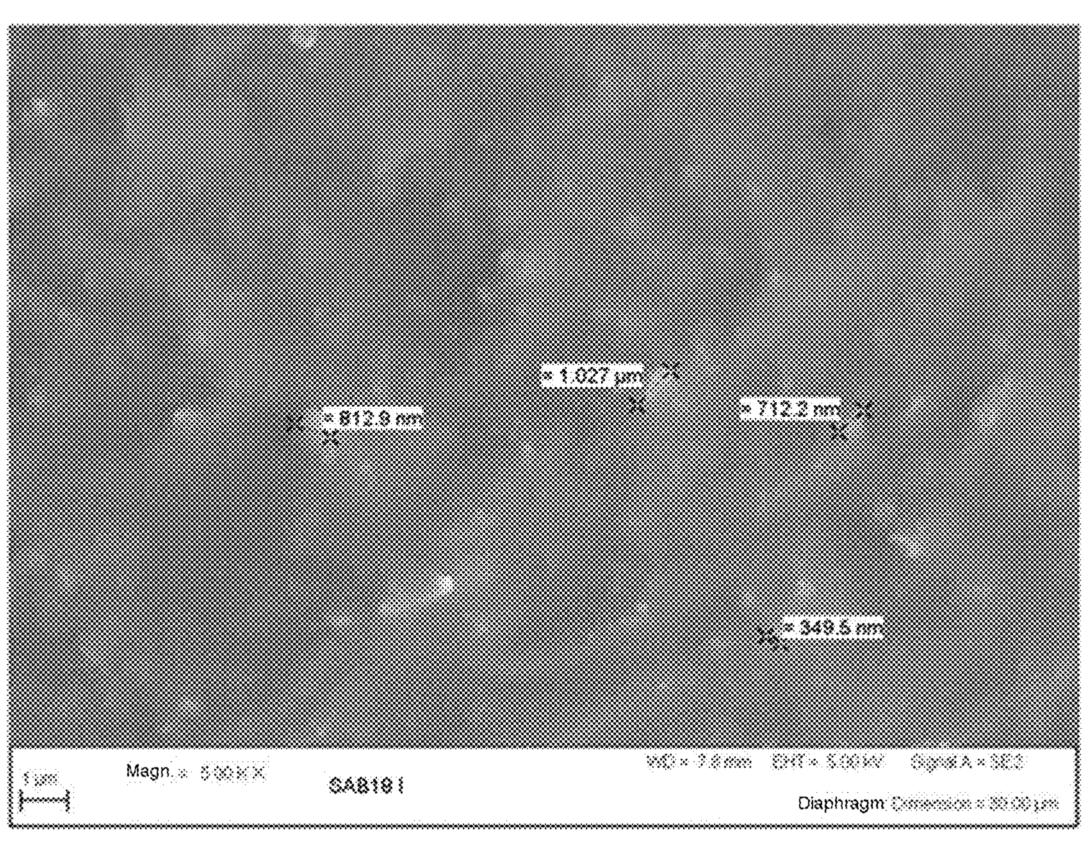

[Fig. 5]
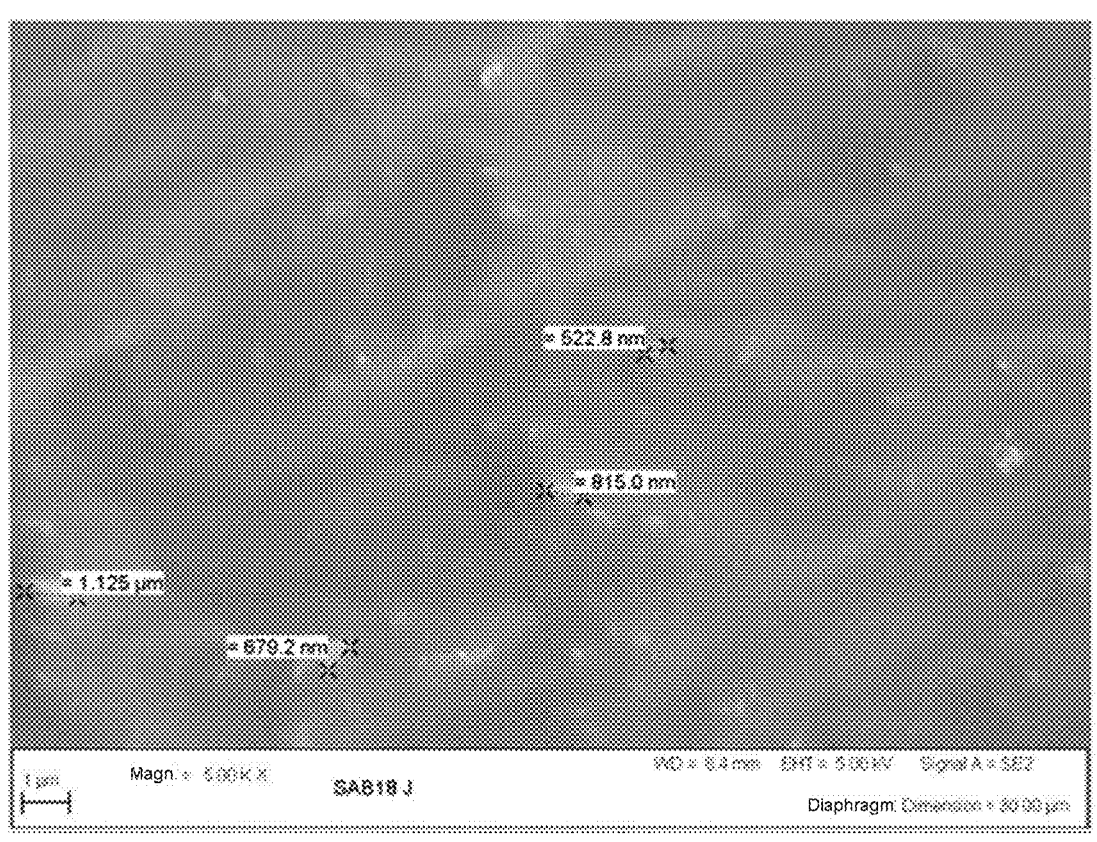

[Fig. 6]
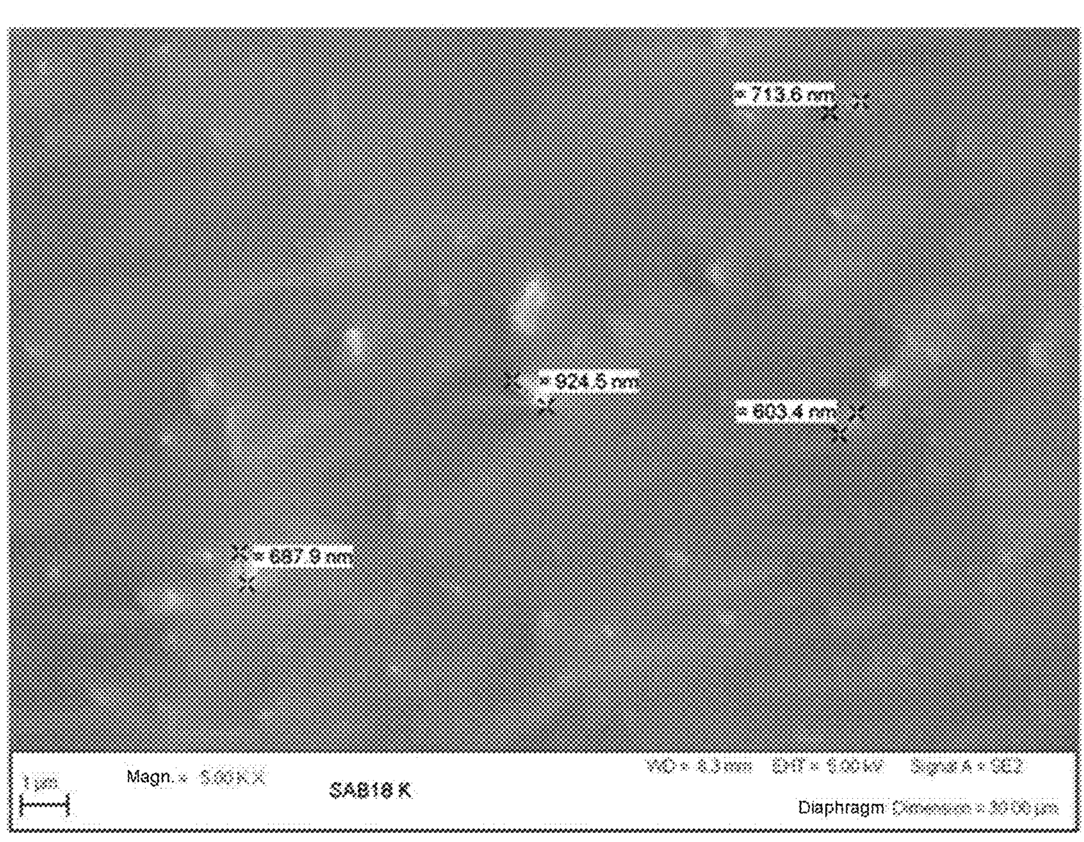

[Fig. 7]
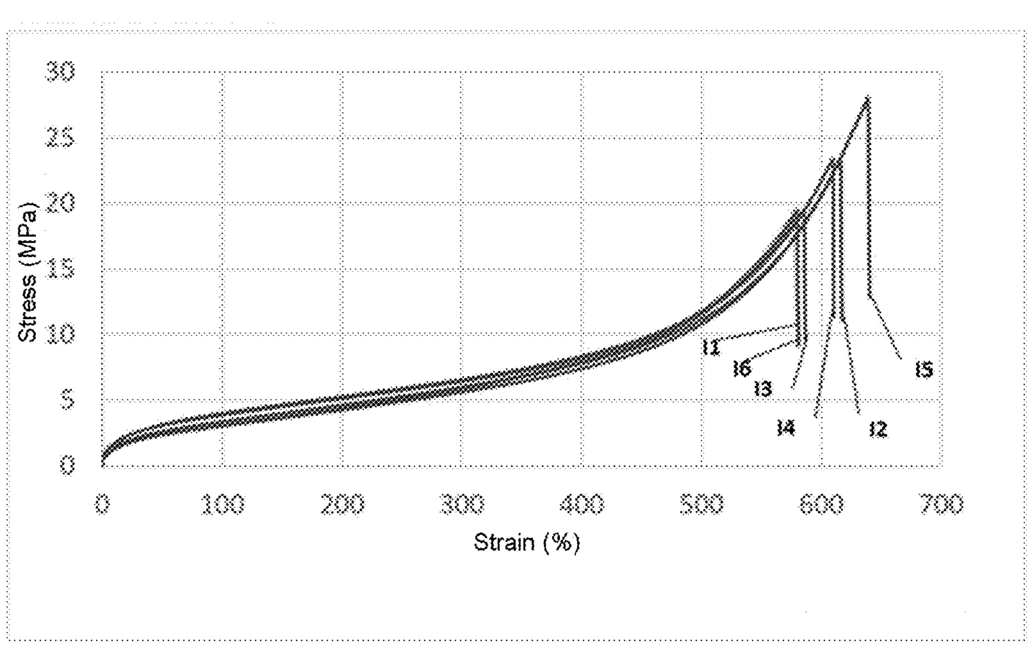

[Fig. 8]
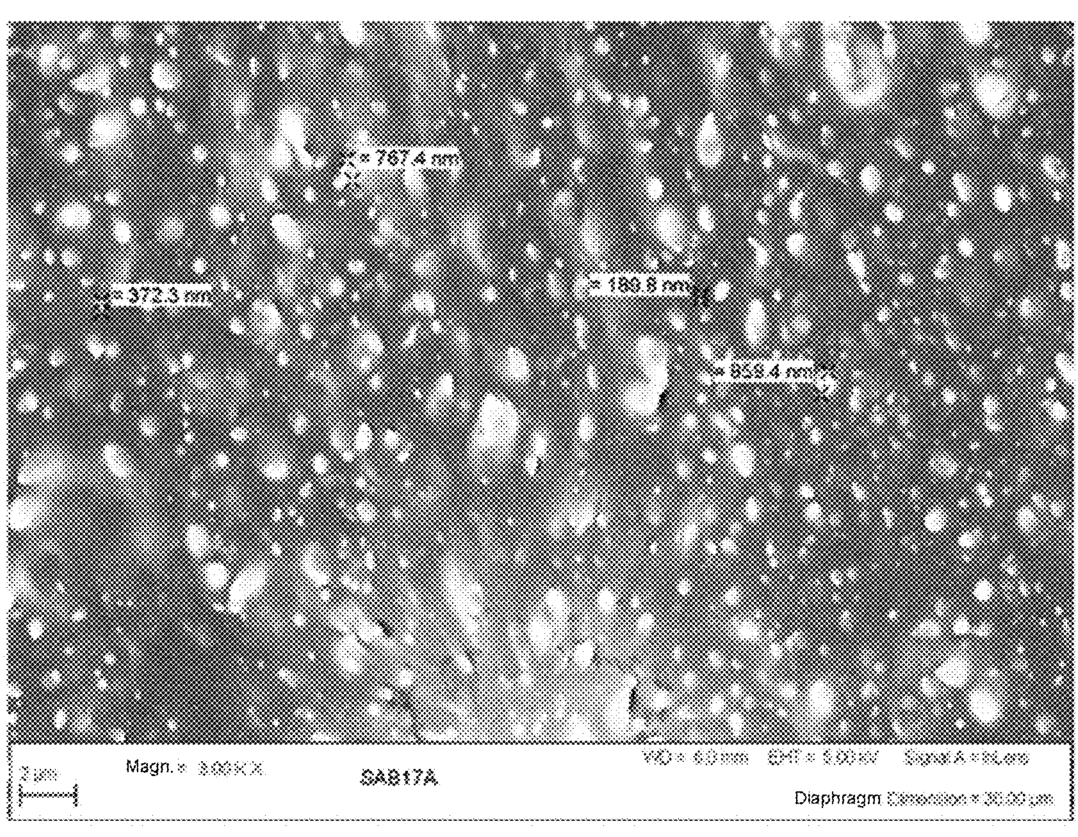

[Fig. 9]
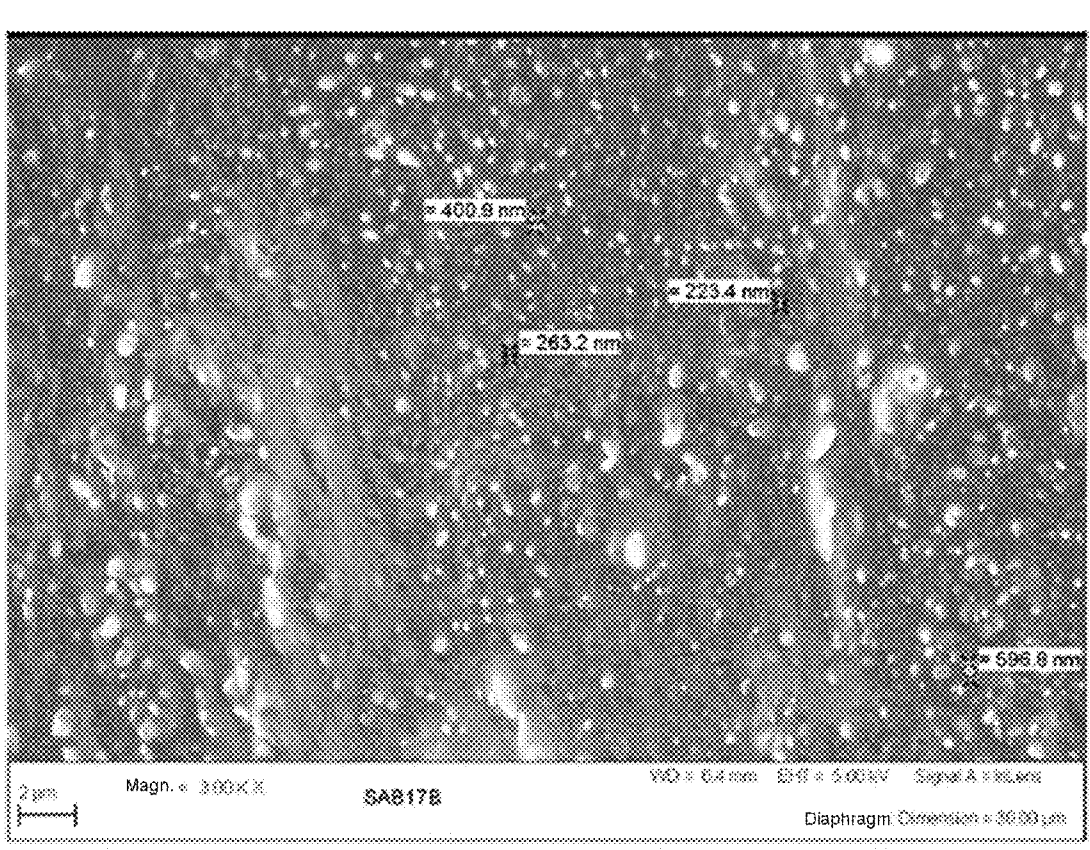

[Fig. 10]
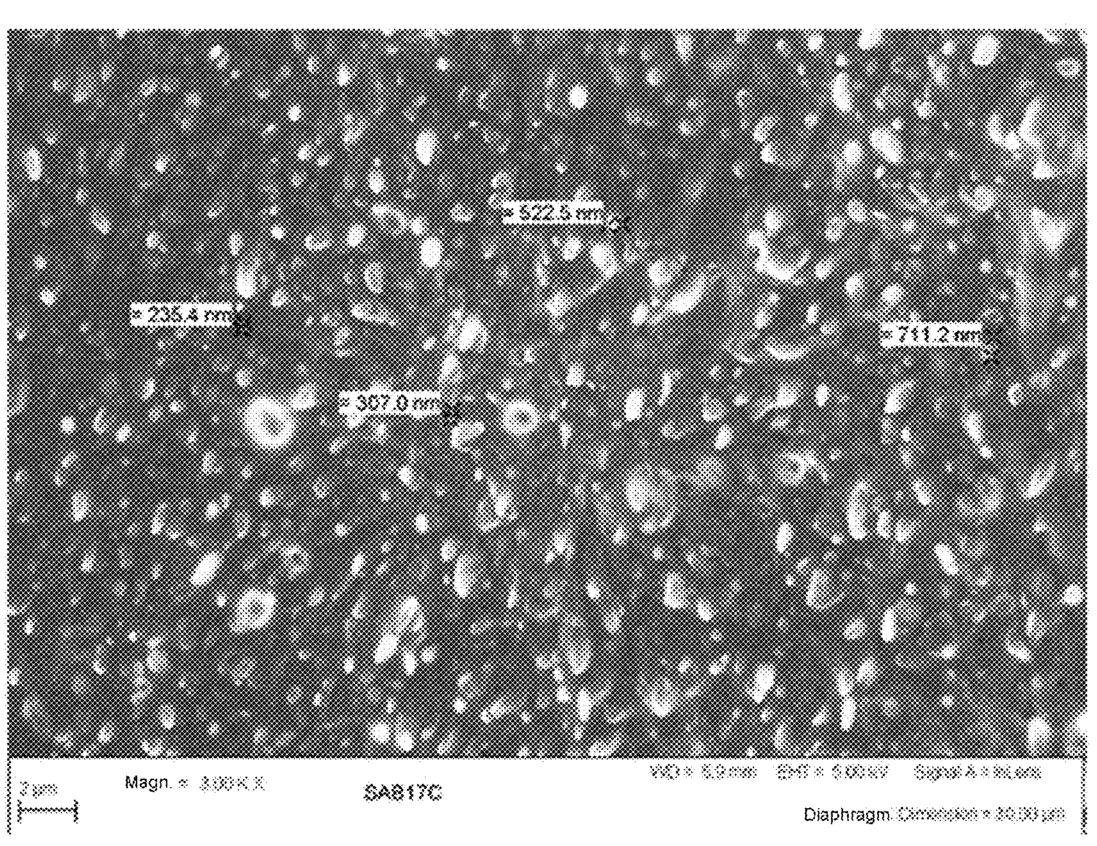

[Fig. 11]
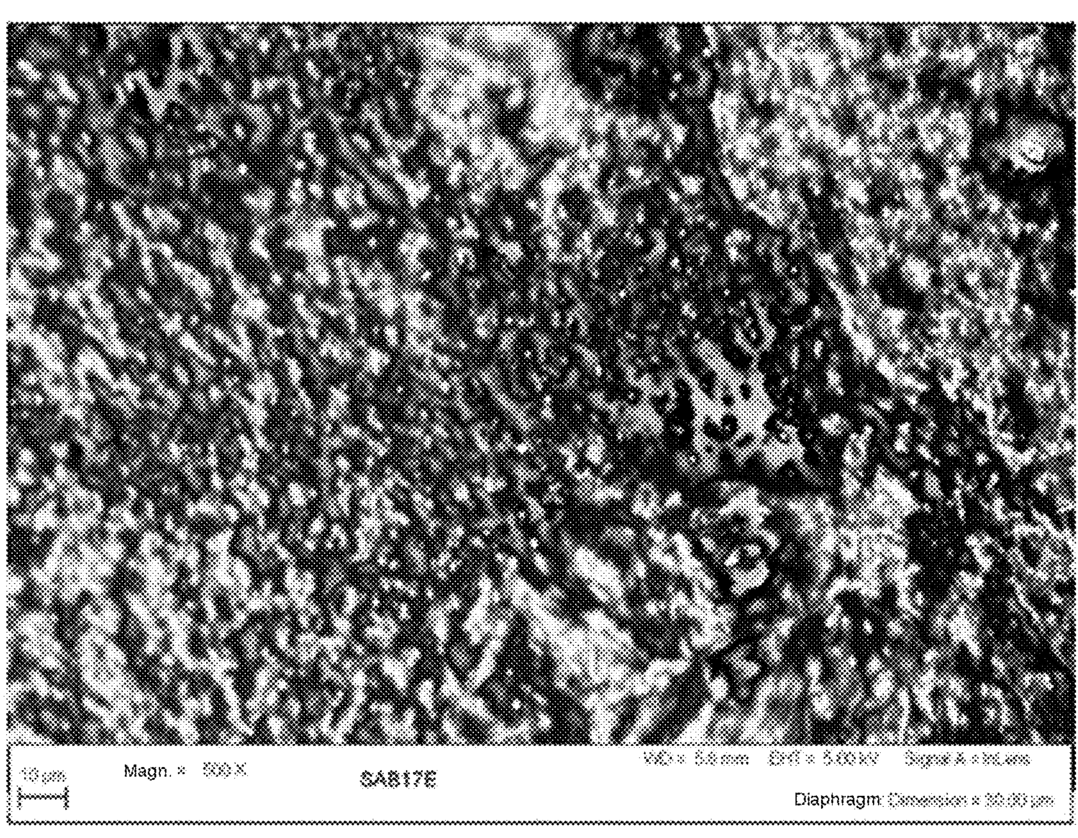

[Fig. 12]
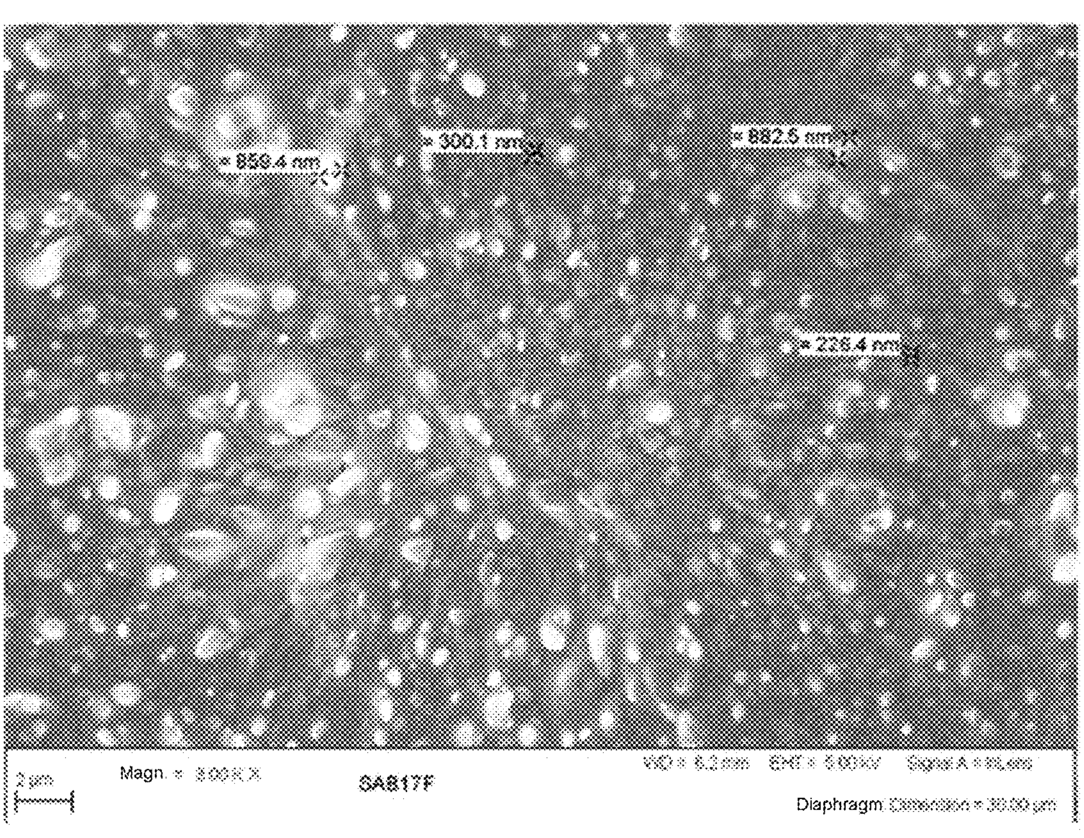

[Fig. 13]
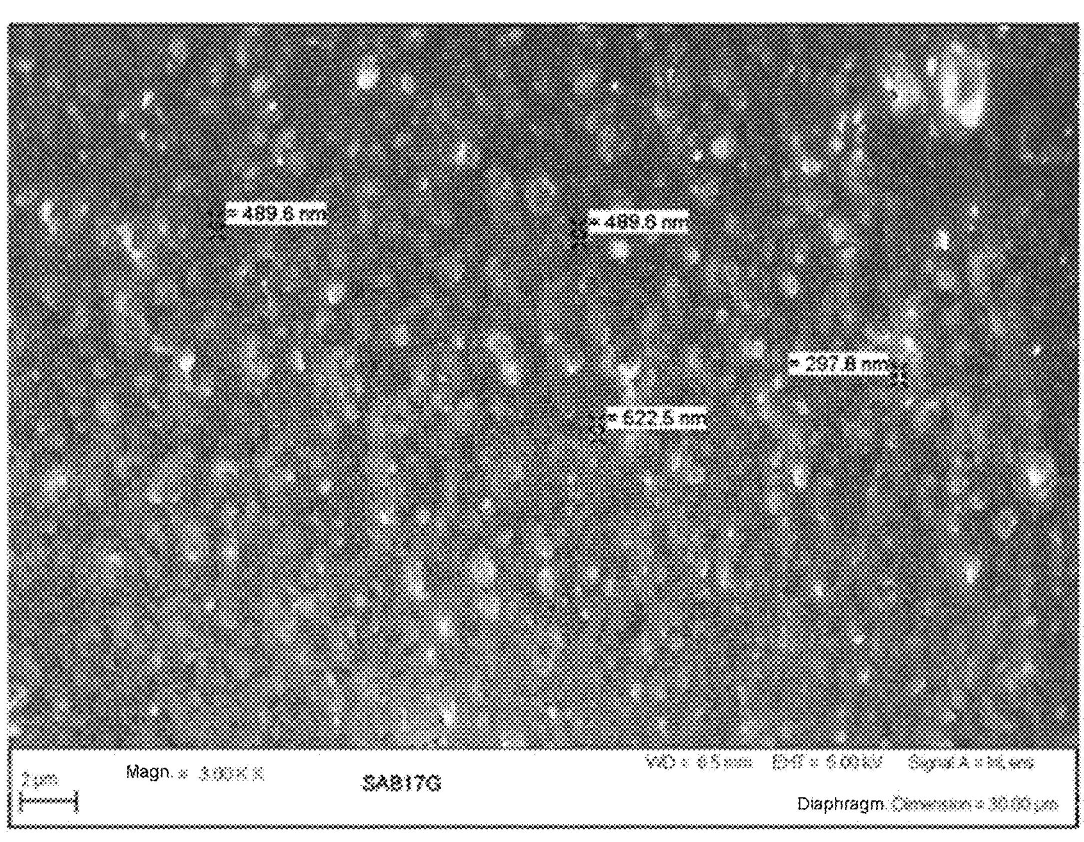

[Fig. 14]
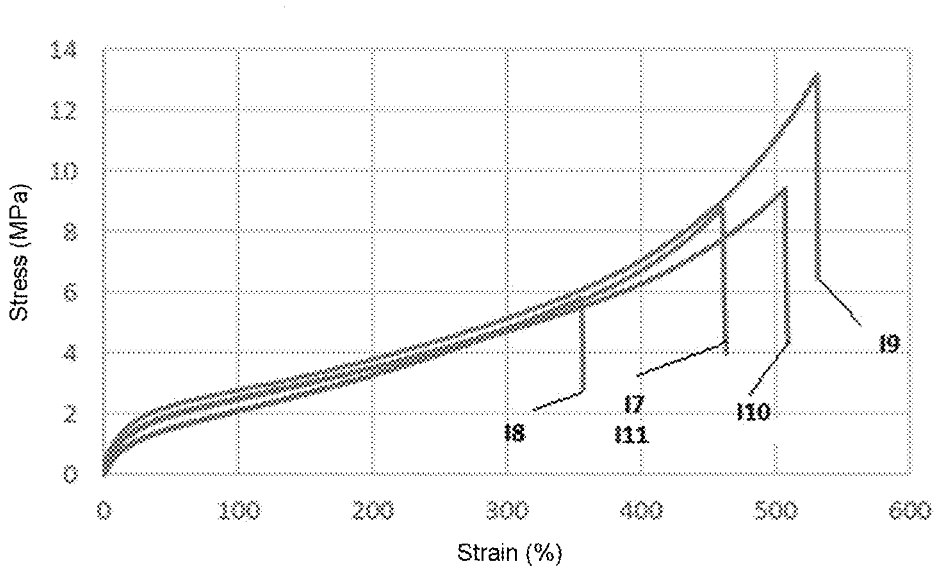

[Fig. 15]
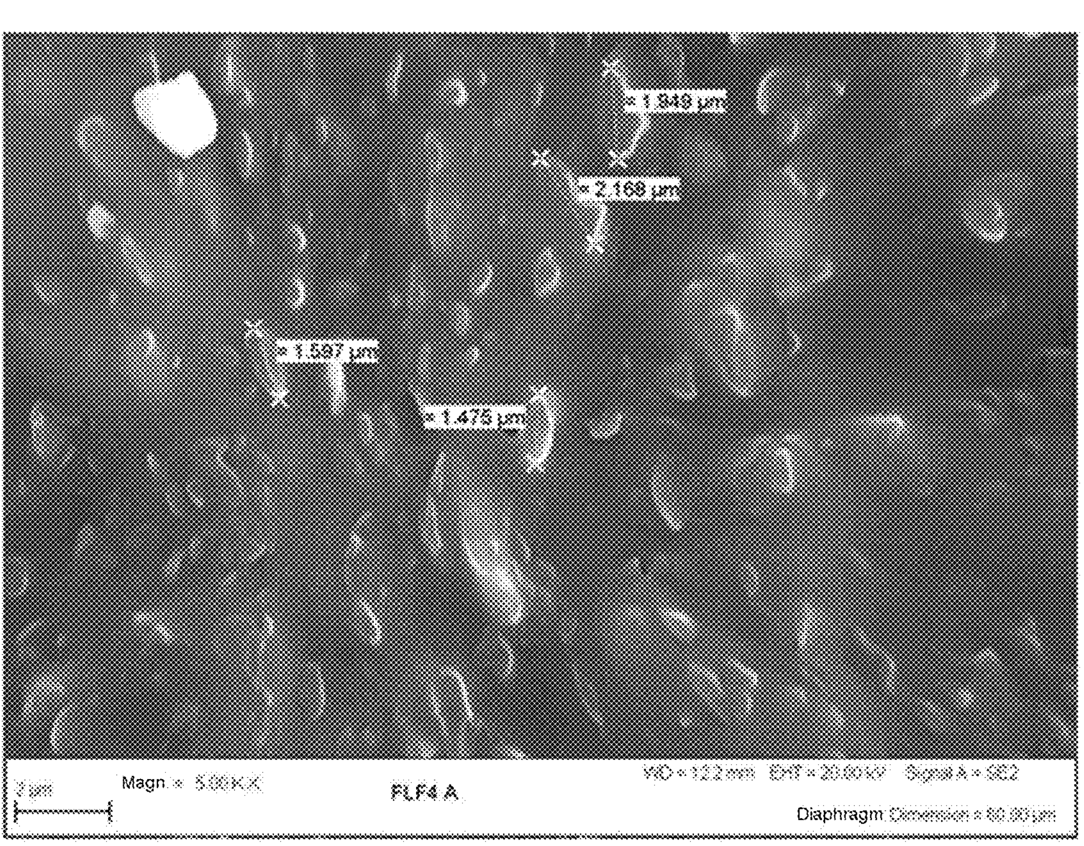

[Fig. 16]
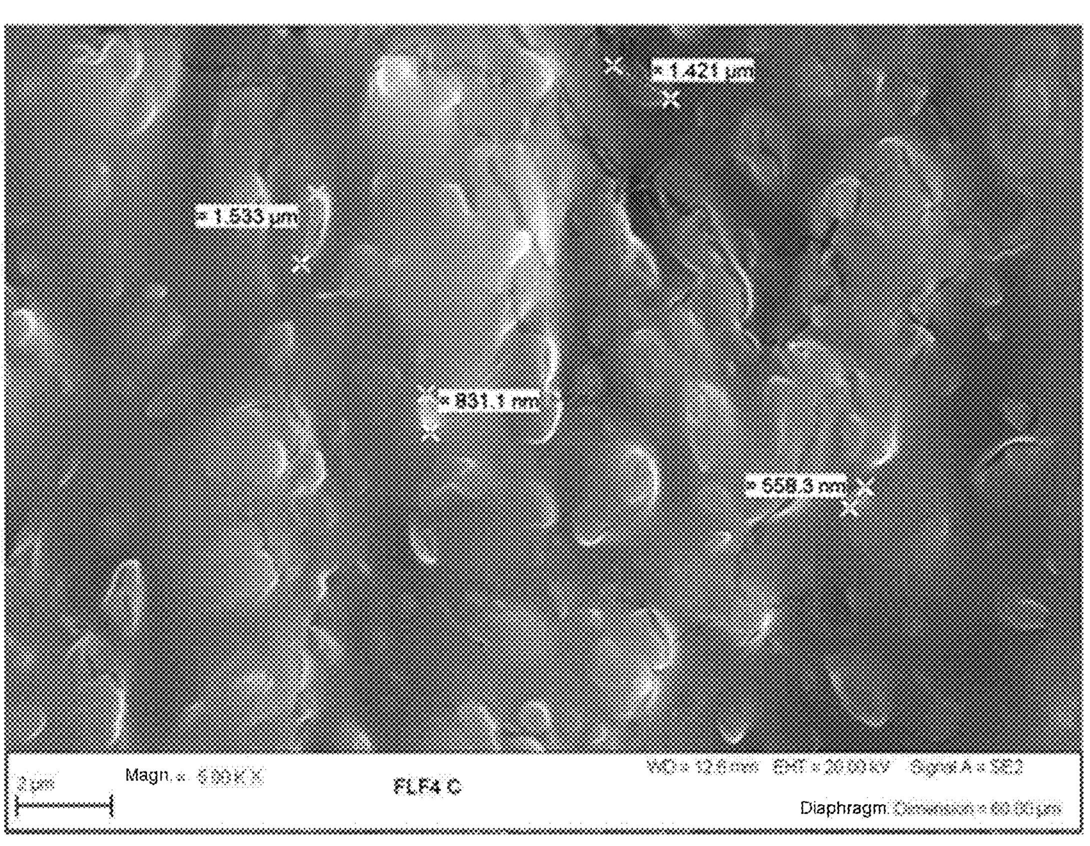

[Fig. 17]
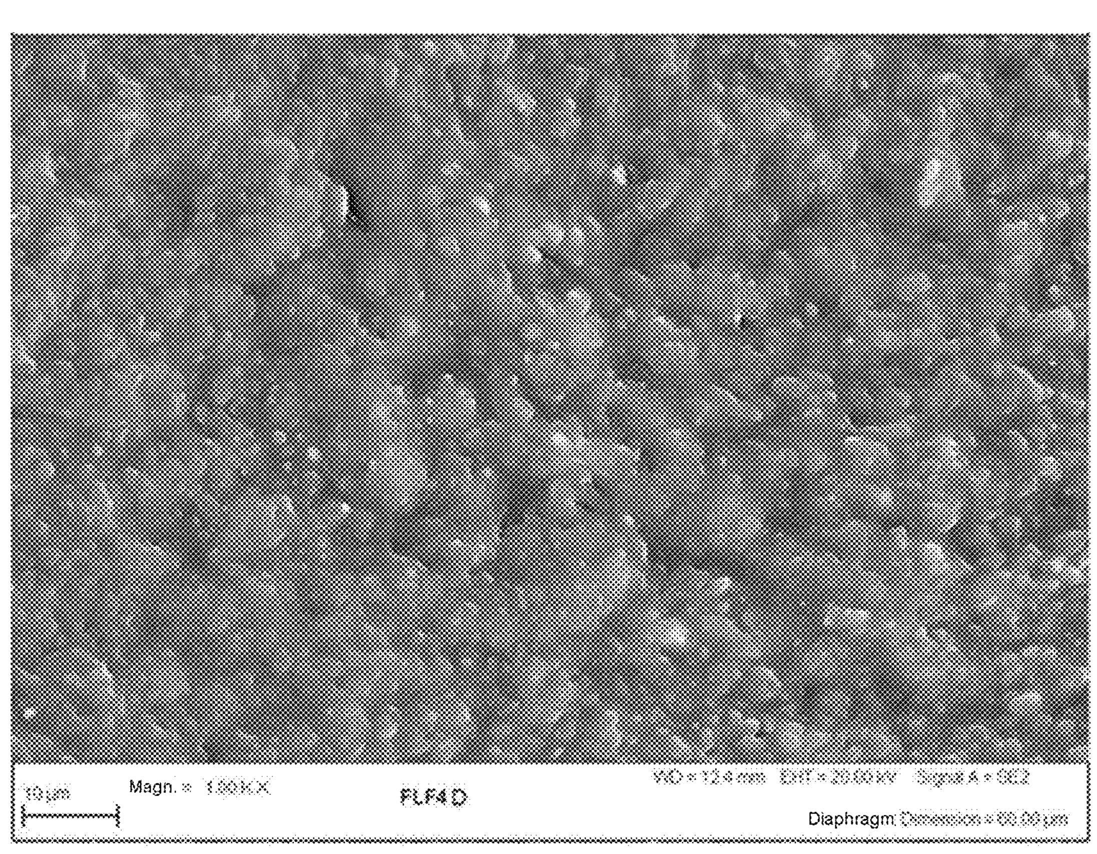

[Fig. 18]
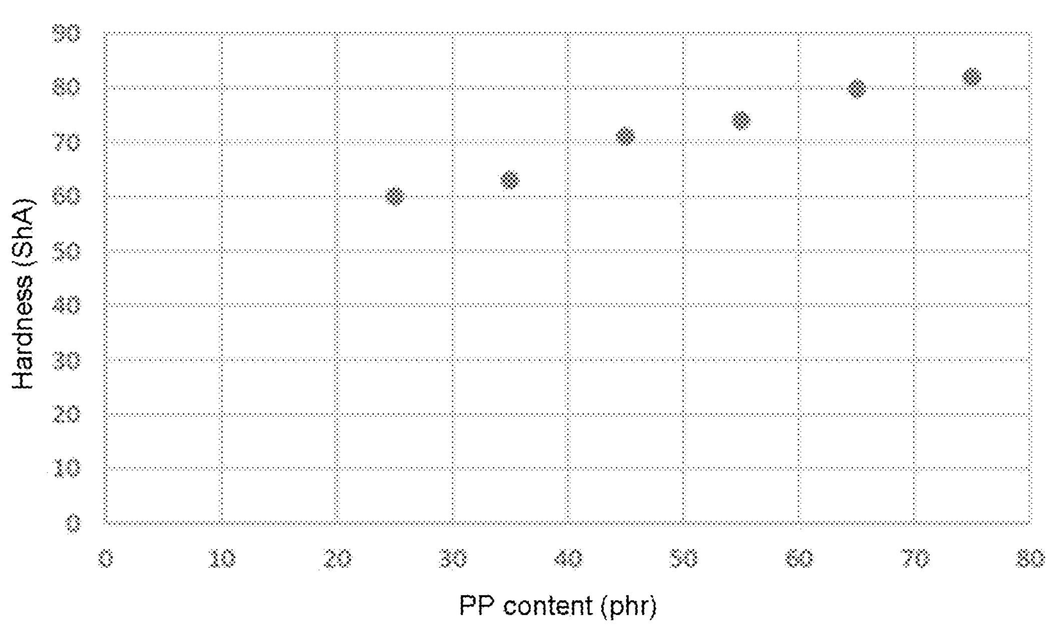

[Fig. 19]
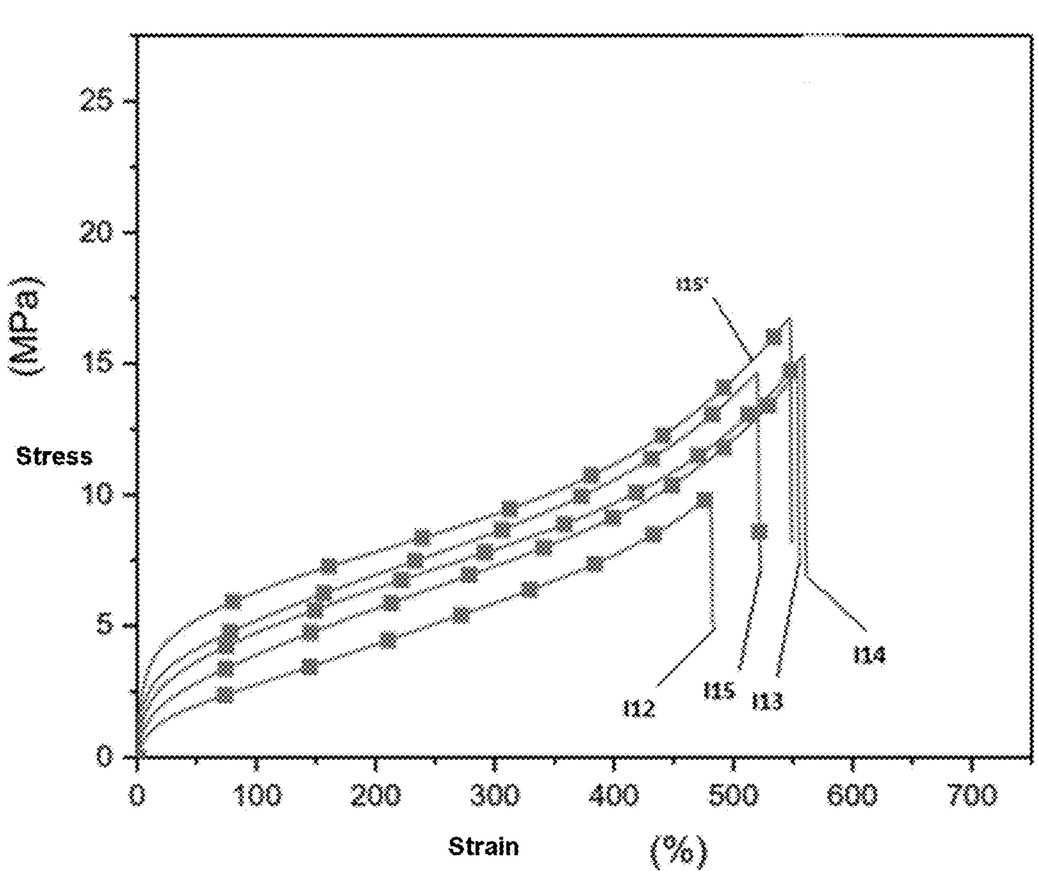

[Fig. 20]

[Fig. 21]
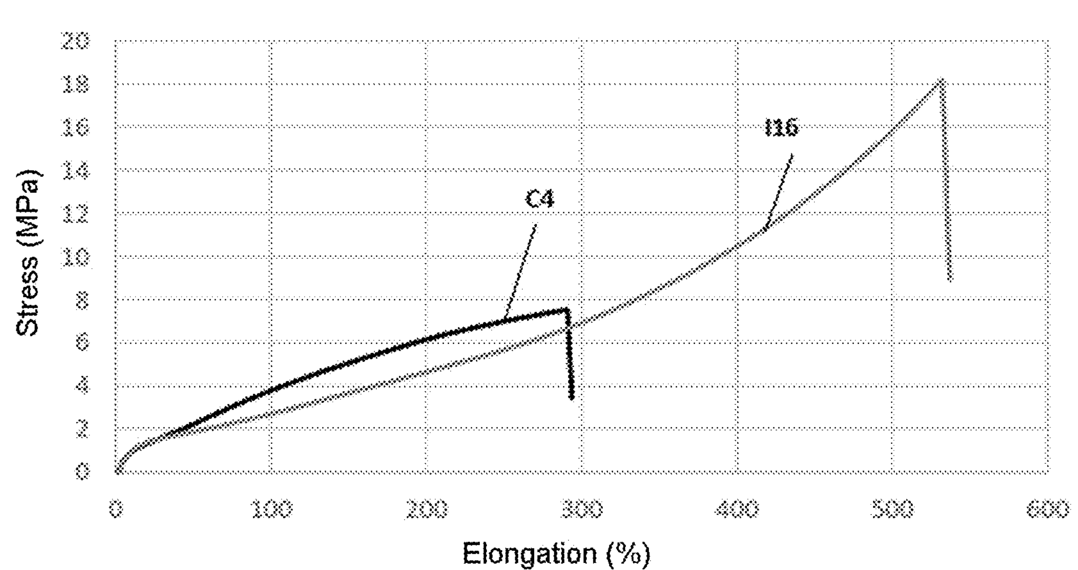
[Fig. 22]
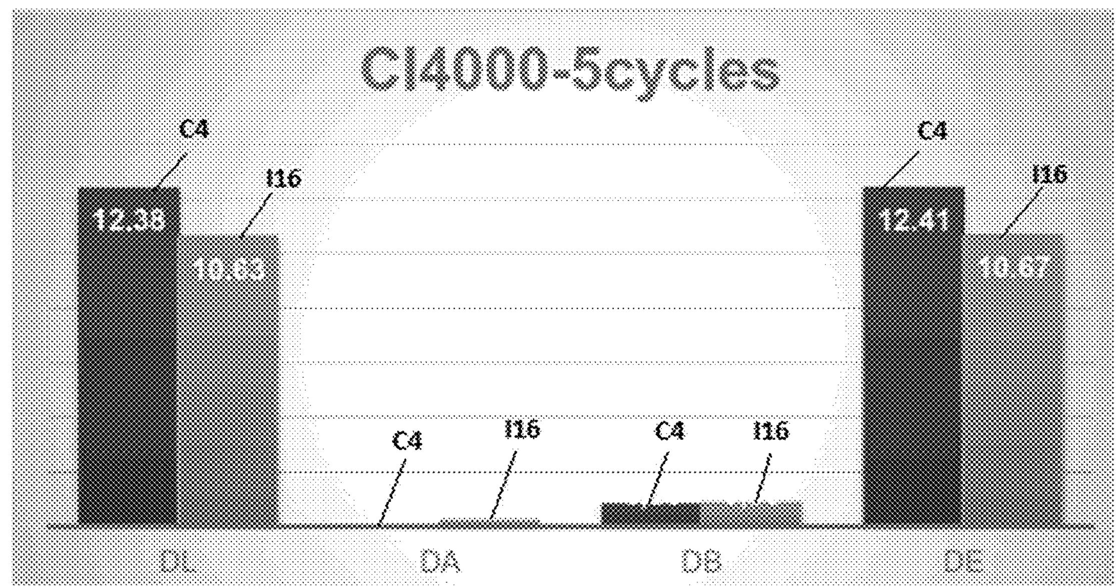

[Fig. 23]
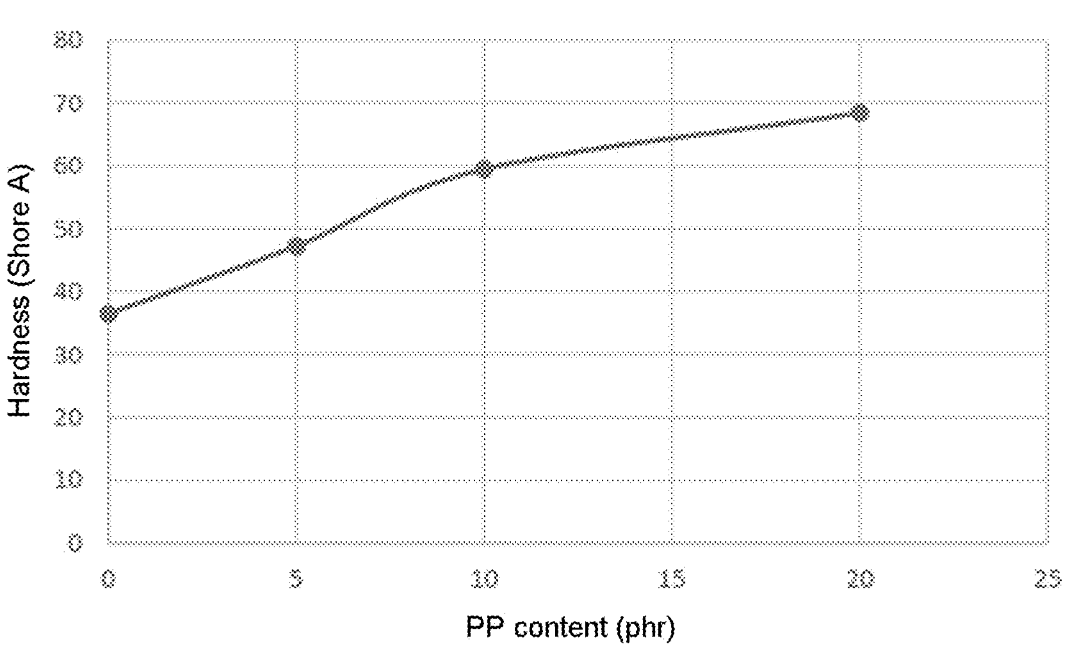
[Fig. 24]
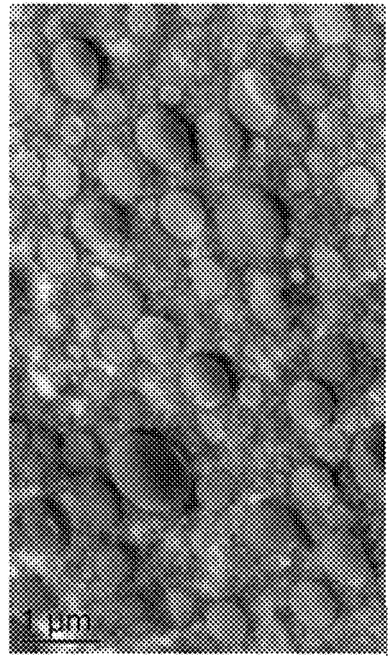

RUBBER COMPOSITION FOR DYNAMIC OR STATIC APPLICATIONS, PROCESS FOR PREPARING SAME AND PRODUCTS INCORPORATING SAME

CROSS-REFERENCE TO RELATED APPLICATIONS

This application is a National Stage Application of PCT/FR2020/050684 filed Apr. 22, 2020, which claims priority from French Patent Application No. 19 04690, filed on May 3, 2019. The priority of said PCT and French Patent Application are claimed.

TECHNICAL FIELD

The invention relates to a crosslinkable rubber composition, to a process for preparing same, to a crosslinked rubber composition, to a mechanical member having a dynamic function and to a sealing element at least a part of which comprises this crosslinked rubber composition. The invention applies in particular to all industrial applications using crosslinked rubber compositions, including said mechanical member having a dynamic function chosen in particular from anti-vibratory supports and elastic articulations for motorized vehicles or industrial devices, and said sealing element chosen in particular from seals for vehicle bodywork and sealing profiles for buildings, these not being limiting.

PRIOR ART

Conventionally, the reinforcement of elastomers within rubber compositions is carried out by adding fillers such as carbon black or silica in order to improve the mechanical properties of the compositions by virtue of the hydrodynamic effect and the interactions between the elastomer and the fillers, on the one hand, and amongst the fillers themselves, on the other. These fillers in the form of powder are dispersed in the rubber by thermomechanical working during the compounding of the ingredients of the composition, aside from the crosslinking system, by heating the mixture to a maximum temperature usually of less than 150° C., typically between 100 and 130° C. for a rubber of ethylene-propylene-diene (EPDM) terpolymer type filled with carbon black.

However, these filler-elastomer and filler-filler interactions give rise to an undesirable phenomenon linked to hysteretic losses which is usually referred to under the name Payne effect and which results in a non-linearity (i.e. amplitude stiffening) and stiffening in particular at low temperatures of crosslinked rubber compositions subjected to dynamic stresses. This stiffening results in dynamic properties which may prove to be unsatisfactory for the compositions due to the abovementioned interactions with the reinforcing fillers used, these dynamic properties usually being able to be evaluated by measuring, at two dynamic strain amplitudes, the ratio of storage moduli G' relative to the complex shear moduli G* of the compositions. As a reminder, the complex modulus G* is defined by the equation $G^*=G'+iG''$, with:

G': real part of G* known as the storage modulus or elastic modulus, G' characterizing the stiffness or the viscoelastic behavior of the composition (i.e. the energy stored and totally restored); and G": imaginary part of G* known as the loss or dissipation modulus, G" characterizing the viscous behavior of the composition (i.e. the energy dissipated in the form of heat, it being pointed out that the ratio G"/G' defines the tan delta loss factor).

This ratio typically corresponds to G', measured at a low dynamic strain amplitude, relative to G' measured at a high dynamic strain amplitude, the two moduli G' being measured at the same frequency and at the same temperature (e.g. G' 0.5%/G' 20%). In a known manner, G' 0.5%/G' 20% is typically between 1.80 and 2.00 for a rubber composition based on a polyisoprene (IR) and reinforced with 40 phr of an N330 grade carbon black in order to be usable in dynamic applications (phr parts by weight per 100 parts of elastomer). Indeed, it is known that in reinforced materials, the viscoelastic behavior varies starting from low dynamic strain amplitudes, with a substantial decrease in G' with a significant increase in strain.

To overcome the abovementioned drawback of high hysteretic losses of the conventionally filled compositions, U.S. Pat. No. 8,247,494 B2 discloses a rubber composition which can be free from carbon black and silica and which is reinforced by a thermoplastic resin dispersed in the form of discrete domains in a continuous phase of a crosslinked olefinic rubber. This document teaches crosslinking of the rubber exclusively by hydrosilylation for the formation of silicon crosslinking bridges.

JP 2002-155 148 A2 discloses a process for preparing a rubber composition comprising a polyolefinic resin microdispersed in an olefinic rubber, by compounding the ingredients at a temperature below the melting point of the polyolefinic resin. These ingredients thus mixed comprise at least 20 phr of carbon black as reinforcing filler, in addition to the rubber and the resin, and the mixture obtained is crosslinked by a sulfur or peroxide system.

EP 3 243 874 A1 discloses a rubber composition for a tire, intended to exhibit improved ozone resistance, comprising a matrix of a nonpolar polymer derived from a conjugated diene (unsaturated rubber such as a polybutadiene), in which matrix domains of an olefinic polymer are dispersed in such a manner that the interface between the matrix and these domains includes covalent bonds. This document teaches the use of a peroxide crosslinking system to crosslink the unsaturated rubber and saturated domains (e.g. those composed of an ethylene-propylene copolymer), and a sulfur crosslinking system for co-crosslinking this unsaturated rubber and likewise unsaturated domains (e.g. those composed of an ethylene-propylene-diene (EPDM) terpolymer).

During its recent research, the applicant has sought intensively to modify processes for compounding these known compositions incorporating discrete thermoplastic domains in the rubber matrix, in such a way that these compositions have reinforcement analogous to that obtained with usual reinforcing fillers of carbon black or silica type without penalizing, and even improving, their mechanical properties.

DISCLOSURE OF THE INVENTION

One object of the present invention is to propose a rubber composition which not only overcomes the abovementioned drawback of high hysteresis of the compositions filled with carbon black or silica but which also has substantially retained reinforcement properties and improved mechanical properties compared to those of a control composition based on the same elastomer matrix and on the same crosslinking system but filled with carbon black.

This object is achieved in that the applicant has discovered, surprisingly, that if a melt reaction is carried out by thermomechanical working of a reaction mixture comprising an elastomer and a thermoplastic polymer having a melting temperature Tm, with heating of the reaction mixture up to a maximum compounding temperature Ta which is greater than Tm and is maintained for a sufficient time, a mixture is obtained which, after addition of a specific crosslinking system in the light of the chosen elastomer and optionally in the light of the thermoplastic polymer, gives a crosslinkable composition in which the thermoplastic polymer is dispersed homogeneously in the elastomer in the form of nodules which are advantageously spherical or ellipsoidal and of nanometric or micrometric size, which makes it possible in particular to obtain for the crosslinkable composition an improved scorch resistance and for the crosslinked composition a reinforcement of the same order and improved mechanical properties even after thermal-oxidative aging or aging by UV radiation, compared to a control composition based on the same ingredients (e.g. same elastomer, same crosslinking system) except for the carbon black that it contains in the place of said thermoplastic polymer.

More specifically, a crosslinkable rubber composition according to the invention is based on at least one elastomer, the composition comprising other ingredients which include a crosslinking system and a thermoplastic polymeric phase which has at least one melting temperature Tm and which is dispersed in said at least one elastomer in the form of nodules, the crosslinkable composition comprising the product:

a) of a melt reaction by thermomechanical working of a reaction mixture comprising said at least one elastomer and said other ingredients, with the exception of the crosslinking system, to obtain a precursor mixture of the crosslinkable composition, then
b) of mechanical working of said precursor mixture with prior addition of the crosslinking system to obtain the crosslinkable composition.

According to the invention:

- the (for example spherical or ellipsoidal) nodules have a weight-average greatest transverse dimension (e.g. diameter or major axis, respectively) of between 10 nm and 10 μm, preferably between 50 nm and 10 μm,
- said reaction comprises heating of the reaction mixture up to a maximum compounding temperature Ta which is greater than the highest of said at least one melting temperature Tm of the thermoplastic polymeric phase and which is maintained for a determined holding time, and
- the crosslinking system comprises sulfur when said at least one elastomer is unsaturated and said thermoplastic polymeric phase comprises saturated polymer chains, and comprises a peroxide when said at least one elastomer is saturated.

The expression "based on" is understood in the present description to mean that the composition or ingredient considered comprises the constituent concerned to a predominant extent by weight, i.e. in a mass fraction of greater than 50%, preferably greater than 75% and possibly extending up to 100%.

The terms "unsaturated" and "saturated" in the present description are understood in a known way to mean an elastomer/thermoplastic polymer which includes at least one unsaturation (i.e. double or triple bond) and which is free from unsaturations (i.e. without double or triple bonds), respectively.

It will be noted that a crosslinkable composition according to the invention thus makes it possible, unexpectedly, by way of this melt reaction product obtained with said heating maintained at an elevated temperature (compared to the compounding of said control composition based on the same ingredients, with the exception of the thermoplastic phase which is replaced by carbon black), combined with the selection of a crosslinking system adapted to the elastomer and to the thermoplastic phase, to obtain a dispersion of the latter in the form of said nodules in the elastomer, with an optimized interface between the elastomer matrix and the thermoplastic nodules, conferring properties which are improved or at least preserved both on the crosslinkable composition (in particular the scorch resistance) and on the crosslinked composition (in particular the mechanical properties under static and dynamic stresses and reinforcement properties).

It will also be noted that a rubber composition according to the invention should not be confused with a thermoplastic elastomer composition, this composition of the invention being specifically characterized by a dispersion of said thermoplastic polymeric phase in said at least one elastomer and therefore being structurally very different from a thermoplastic vulcanizate in which the thermoplastic base contains a dispersion of rubber nodules.

It will additionally be noted that the crosslinkable composition according to the invention in particular makes it possible, following the crosslinking thereof, to confer on the crosslinked composition:

- a significantly reduced density compared to that of said control composition reinforced with carbon black instead of the nodules of said thermoplastic phase,
- static properties which are at least preserved or are improved compared to those of the control composition and which are virtually not penalized following thermal-oxidative aging or aging by UV radiation, and
- a conductivity which is minimized compared to this control composition.

According to the invention, said weight-average greatest transverse dimension of the nodules of the thermoplastic polymeric phase is measured in particular by scanning electron microscopy (SEM) coupled with an X-ray photon detector (SEM/EDX), with gold/palladium metallization.

Advantageously according to the invention, the nodules may have a weight-average greatest transverse dimension of between 100 nm and 10 μm, and the holding time of said maximum compounding temperature Ta is at least 10 seconds.

According to another feature of the invention, the crosslinkable composition may comprise, as powdered filler dispersed in said at least one elastomer, from 0 to 100 phr (preferably from 0 to 50 phr and even more preferentially from 0 to 10 phr, or even from 0 to 5 phr) of an organic filler such as carbon black and from 0 to 70 phr (for example from 10 to 60 phr) of a non-reinforcing inorganic filler other than a silica (phr parts by weight per 100 parts of elastomer(s)), and advantageously the crosslinkable composition may be completely free from organic or inorganic powdered filler.

The term "filler" in the present description is understood to mean one or more individual fillers, of reinforcing grade or otherwise, for the elastomer concerned, these filler(s) being dispersed homogeneously in powder form in the composition (in contrast to the nodules of the present invention), and the term "inorganic filler" is understood to mean a clear filler (sometimes called 'White filler') as opposed to the organic fillers such as carbon blacks and graphite, for example.

It will be noted that a composition according to the invention is thus free from carbon black or else contains at most 100 phr (preferably at most 50 phr, or at most 10 phr or even at most 5 phr) of carbon black, and that this composition of the invention may be free from silica and may optionally comprise at most 70 phr of a non-reinforcing inorganic filler such as chalk or an aluminosilicate such as kaolin, in a non-limiting manner.

Likewise advantageously, the crosslinkable composition may have a scorch resistance measured according to the standard ISO 289-2 via t5 and t35 times without premature crosslinking of the composition which are both greater than 17 minutes and even more advantageously greater than 20 minutes, t5 and t35 relating to Mooney viscosity increments ML(1+4) at 125° C. relative to the initial Mooney viscosity respectively of +5 and +35 points.

It will be noted that these t5 and t35 times are much higher than those of said control composition filled with carbon black.

According to one embodiment of the invention, the crosslinking system comprises sulfur and optionally additionally a peroxide, said at least one elastomer being a rubber chosen from:

- functionalized or non-functionalized olefinic rubbers, such as ethylene-alpha-olefin copolymers such as for example ethylene-propylene (EPM) copolymers and ethylene-propylene-diene (EPDM) terpolymers, and
- functionalized or non-functionalized diene rubbers obtained at least in part from conjugated diene monomers, such as natural rubber (NR), isoprene homopolymers and copolymers, and butadiene homopolymers and copolymers, and said thermoplastic polymeric phase comprises at least one saturated polymer preferably chosen from functionalized or non-functionalized aliphatic or aromatic polyolefins, such as for example homopolymers or copolymers of ethylene or of propylene.

It will be noted that this sulfur crosslinking system comprises, in a known way, in addition to sulfur, all or some of the usual vulcanization activators and accelerators.

As ethylene-alpha-olefin copolymers for the olefinic rubbers, mention may be made in general of those derived from ethylene and an alpha-olefin having from 3 to 20 carbon atoms and preferably from 3 to 12 carbon atoms, such as propylene, 1-butene, 1-pentene, 1-hexene, 4-methyl-1-pentene, 1-heptene, 1-octene, 1-nonene, 1-decene, 1-undecene and 1-dodecene. Alpha-olefins chosen from propylene, 1-butene, 1-hexene, 4-methyl-1-pentene and 1-octene are preferred.

As copolymers of isoprene and of butadiene for the diene rubbers, mention may for example be made of isoprene-butadiene (BIR) copolymers, and copolymers of isoprene and/or of butadiene with a vinylaromatic comonomer such as styrene (SIR, SBR, SBIR).

According to one example of this embodiment, said at least one elastomer is an EPDM having a mass content of units derived from ethylene of between 15% and 80%, and said thermoplastic polymeric phase comprises at least one said aliphatic polyolefin chosen from ethylene homopolymers, propylene homopolymers and polypropylene-ethylene-diene terpolymers having a mass content of units derived from ethylene of between 1% and 15%.

It will be noted that the EPDM usable as elastomer in the composition of the invention may thus have a relatively high mass content of units derived from ethylene of between 60% and 80%, or conversely of between 15% and 20%. As for the aliphatic polyolefin forming the thermoplastic phase of the invention, this may be a "PEDM" derived predominantly from polypropylene, in a mass content of at least 80% (with for example between 5% and 15% of ethylene and between 2.5% and 5% of diene).

According to another embodiment of the invention, the crosslinking system comprises a peroxide and optionally additionally sulfur, said at least one elastomer being saturated and said thermoplastic polymeric phase comprising saturated or unsaturated polymer chains, and preferably said at least one elastomer is a silicone rubber for example chosen from polydimethylsiloxanes (PDMS), and said thermoplastic polymeric phase comprises at least one saturated polymer for example chosen from phenyl silicone or alkyl silicone resins.

It will be noted that this peroxide crosslinking system may advantageously comprise an organic peroxide as crosslinking agent and a crosslinking coagent comprising, for example, triallyl cyanurate (TAC) or triallyl isocyanurate (TAIC).

As silicone rubber, it is possible in general to use any polyorganosiloxane, and as saturated polymer it is possible to use any thermoplastic silicone resin, for example of alkyl (e.g. methyl) silicone or phenyl silicone type.

In general, the crosslinkable composition of the invention may comprise said thermoplastic polymeric phase in an amount of between 1 and 150 phr (phr parts by weight per 100 parts of elastomer(s)) and preferably of between 5 and 70 phr (even more preferentially between 15 and 50 phr), and said nodules formed by said thermoplastic polymeric phase have said weight-average greatest transverse dimension of between 150 nm and 3 μm, preferably between 300 nm and 2 μm.

According to another general aspect of the invention, said nodules may advantageously be spherical or ellipsoidal, for example.

A crosslinked rubber composition according to the invention is the product of thermal crosslinking of the crosslinkable composition as defined above by chemical reaction with said crosslinking system.

It will be noted that this crosslinking of the crosslinkable composition may be obtained via heating for example between 140 and 220° C., preferably between 160 and 200° C.

According to another feature of the invention, the crosslinked composition may comprise, as powdered filler dispersed in said at least one elastomer, from 0 to 100 phr (preferably from 0 to 50 phr and even more preferentially from 0 to 10 phr, or even from 0 to 5 phr) of an organic filler such as carbon black and from 0 to 70 phr (for example from 10 to 60 phr) of an inorganic filler other than a silica (such as chalk or an aluminosilicate such as for example kaolin), and preferably the crosslinked composition is completely free from said organic or inorganic powdered filler.

Advantageously, the crosslinked composition may have:

- a density of less than 1.10, even more advantageously of less than or equal to 1, and/or
- a volume resistivity, measured according to the standard IEC 62631 3-1, of greater than $10^{10}$ Ω·cm and even more advantageously of greater than $10^{14}$ Ω·cm.

It will be noted that the density of a crosslinked composition according to the invention, all embodiments and examples combined, is thus significantly reduced (advantageously by more than 10%, or even by more than 15%) compared to a control composition based on the same ingredients (e.g. same elastomer matrix and crosslinking system) but filled with carbon black as replacement for said thermoplastic phase.

It will also be noted that the electrical resistivity of a crosslinked composition according to the invention, all embodiments and examples combined, is thus very greatly increased compared to this control composition filled with carbon black.

Likewise advantageously, the crosslinked composition according to the invention (all embodiments and examples included) may have a Shore A hardness measured according to the standard ASTM D2240 and a ratio G' 0.5%/G' 20% of storage moduli G' relative to the complex shear moduli G* satisfying at least one of the following conditions (i) and (ii) at 100° C.:

(i) G' 0.5%/G' 20%≤1.50 if the Shore A hardness is from 40 to 50, ≤1.80 if the Shore A hardness is from 51 to 60, and ≤2.00 if the Shore A hardness is from 51 to 60, (ii) tan delta at 0.5% strain S 0.080, preferably S 0.050, G' 0.5% and G' 20% being measured at respective dynamic strain amplitudes of 0.5% and 20% on double shear test specimens crosslinked at 177° C. and subjected to a shear strain sweep of 0.5% to 60% at the same frequency of 1.7 Hz and the same temperature of 100° C., and tan delta representing the loss factor measured during said strain sweep.

It will be noted that these conditions show a Payne effect and hysteretic losses which are significantly reduced for a crosslinked composition of the invention, compared to the corresponding control composition based on the same ingredients (e.g. same elastomer matrix and crosslinking system) but filled with carbon black as replacement for the thermoplastic phase.

According to one embodiment of the invention presented above, in which said at least one elastomer comprises said olefinic rubber such as an EPM or EPDM and said thermoplastic polymeric phase comprises said at least one aliphatic polyolefin, the crosslinked composition may have a Shore A hardness measured according to the standard ASTM D2240 and a ratio G' 30 Hz/G' 0.3 Hz of storage moduli G' relative to the complex shear moduli G* and a loss factor tan delta satisfying at least one of the following conditions (i) and (ii) at 100° C.:

(i) G' 30 Hz/G' 0.3 Hz≤1.20 if the Shore A hardness is from 51 to 60 and ≤1.10 if the Shore A hardness is from 61 to 70, (ii) tan delta at 3 Hz≤0.80 if the Shore A hardness is from 51 to 60 and ≤0.10 if the Shore A hardness is from 61 to 70, G' 30 Hz and G' 0.3 Hz being measured at a dynamic strain amplitude of 0.5% on double shear test specimens crosslinked at 177° C. and subjected to a frequency sweep of 0.100 Hz to 30 000 Hz at the same temperature of 100° C., and tan delta being measured at 3 Hz during said frequency sweep.

In accordance with embodiments of the invention in which said at least one elastomer comprises said olefinic rubber such as an EPM or EPDM, or a diene rubber derived at least in part from a conjugated diene monomer such as natural rubber, and in which said thermoplastic polymeric phase comprises said at least one aliphatic polyolefin, the crosslinked composition may have a Shore A hardness measured according to the standard ASTM D2240 and a ratio of moduli M 155 Hz/M 15 Hz and a loss factortan D at 15 Hz which are measured at 23° C. via a frequency sweep according to the standard ISO 4664 by a Metravib® viscosity analyzer on Metravib® block-type test specimens and which satisfy at least one of the conditions (i) and (ii):

(i) M 155 Hz/M 15 Hz≤1.50 if the Shore A hardness is from 40 to 50 and ≤2.00 if the Shore A hardness is from 61 to 70, (ii) tan D at 15 Hz≤0.10 if the Shore A hardness is from 40 to 50, ≤0.15 if the Shore A hardness is from 51 to 60, and ≤0.20 if the Shore A hardness is from 61 to 70.

Likewise in accordance with this embodiment of the invention in which said at least one elastomer comprises said olefinic rubber such as an EPM or EPDM and said thermoplastic polymeric phase comprises said at least one aliphatic polyolefin, the crosslinked composition may satisfy at least one of the following conditions (i) to (iii):

(i) an elongation at break, measured in uniaxial tension according to the standard ASTM D 412, of greater than 250% and preferably greater than 400%;

(ii) a breaking stress, measured in uniaxial tension according to the standard ASTM D 412, of greater than 4 MPa and preferably greater than 12 MPa; and (iii) a Shore A hardness measured after 3 seconds according to the standard ASTM D2240 which is greater than 40 and preferably equal to or greater than 60.

It will be noted that these conditions show reinforcing and static mechanical properties which are at least preserved, if not improved, compared to the corresponding control composition based on the same ingredients (e.g. same elastomer matrix and crosslinking system) but filled with carbon black as replacement for said aliphatic polyolefin.

It will also be noted that the applicant has verified that these reinforcing and static properties are advantageously virtually not penalized following thermal-oxidative aging (i.e. under hot air) or following aging by exposure to UV radiation.

According to another embodiment of the invention presented above in which said at least one elastomer comprises said silicone rubber preferably chosen from polydimethylsiloxanes (PDMS) and said thermoplastic polymeric phase comprises said at least one saturated polymer preferably chosen from phenyl or alkyl silicone resins, the crosslinked composition may be completely free from said powdered filler such as silica.

Surprisingly, it will be noted that this absence of silica in such a rubber composition based on a silicone rubber (which usually contains silica as reinforcing filler), the increased level of reinforcement obtained by virtue of the dispersion of the phenyl or alkyl silicone resin nodules does not result in mechanical non-linearities observed under dynamic stresses, which advantageously manifests in a likewise reduced Payne effect for this embodiment compared to the control composition based on the same ingredients (e.g. same elastomer matrix and crosslinking system) but filled with carbon black as replacement for this resin.

Likewise in accordance with the abovementioned embodiment of the invention in which said at least one elastomer comprises said diene rubber derived at least in part from a conjugated diene monomer, such as natural rubber, and said thermoplastic polymeric phase comprises said at least one aliphatic polyolefin, the crosslinked composition may satisfy at least one of the following conditions (i) to (iii):

(i) at least one of the following secant moduli M100, M200 and M300, at 100%, 200% and 300% strain, respectively, measured in uniaxial tension according to the standard ASTM D 412:

M100 of greater than 3 MPa, preferably equal to or greater than 5 MPa,

M200 of greater than 6 MPa, preferably equal to or greater than 8 MPa,

M300 of greater than 11 MPa, preferably equal to or greater than 13 MPa;

(ii) a breaking stress, measured in uniaxial tension according to the standard ASTM D 412, of greater than 13 MPa and preferably greater than 18 MPa; and (iii) a Shore A hardness measured after 3 seconds according to the standard ASTM D2240 which is greater than 45 and preferably equal to or greater than 60.

It will be noted that these conditions show reinforcing and static mechanical properties which are at least preserved, if not improved, compared to the corresponding control composition based on the same ingredients (e.g. same elastomer matrix and crosslinking system) but filled with carbon black as replacement for said aliphatic polyolefin.

It will also be noted that the applicant has verified that these reinforcing and static properties are advantageously virtually not penalized following thermal-oxidative aging (i.e. under hot air) or following aging by exposure to UV radiation.

A mechanical member having a dynamic function according to the invention is chosen in particular from antivibratory supports and elastic articulations for motorized vehicles or industrial devices, said member comprising at least one elastic part which is composed of a crosslinked rubber composition and which is suitable for being subjected to dynamic stresses, and according to the invention said crosslinked composition is as defined above.

A sealing element according to the invention is chosen in particular from seals for vehicle bodywork and sealing profiles for buildings, said sealing element comprising an elastic part which is composed of a crosslinked rubber composition, and according to the invention the crosslinked rubber composition is as defined above.

It will be noted that in this case, for example in a seal ensuring leaktightness in a motor vehicle bodywork, it is possible to incorporate into the composition of the invention at most 100 phr of carbon black and between 10 and 60 phr of an inorganic filler other than silica, for example chalk or an aluminosilicate such as kaolin, combined with a metal oxide such as an oxide of calcium.

A process according to the invention for preparing a crosslinkable composition as defined above comprises the following steps:

a) introduction, into an internal mixer, for example a tangential or intermeshing (i.e. with intermeshing rotors) internal mixer, or into a screw extruder, for example a twin-screw extruder, of said at least one elastomer and then said other ingredients, with the exception of said crosslinking system;

b) thermomechanical working in said internal mixer or in said screw extruder, comprising melt compounding of said reaction mixture with the exception of the crosslinking system to obtain a precursor mixture of the crosslinkable composition, step b) comprising b1) heating said reaction mixture up to said maximum compounding temperature Ta which is greater than the highest of said at least one melting temperature Tm of said thermoplastic polymeric phase, preferably by a difference Ta−Tm of between 1 and 50° C.; and b2) stabilizing said heating by maintaining said maximum compounding temperature Ta for said holding time of at least 10 seconds, said holding time preferably being between 20 seconds and 10 minutes;

c) removal of the mixture from said internal mixer or said screw extruder, and optionally cooling it; and then d) mechanical working of said precursor mixture for example at a temperature of between 20 and 50° C. with prior addition of said crosslinking system comprising sulfur and/or a peroxide to obtain the crosslinkable composition.

Preferably, the difference Ta−Tm is between 5 and 30° C., even more preferentially between 10 and 20° C.

It will be noted that the value chosen for Ta also depends on that of Tm which characterizes the thermoplastic polymeric phase used, and that in the case in which said thermoplastic polymeric phase is based on an aliphatic polyolefin such as a polypropylene, Ta may for example be between 160 and 220° C., preferably between 170 and 200° C., whereas in the case in which this thermoplastic phase is an alkyl or phenyl silicone resin, Ta may for example be between 70 and 150° C., preferably between 80 and 120° C.

Likewise preferably, Ta is maintained for a time of between 30 seconds and 8 minutes, even more preferentially between 1 minute and 5 minutes.

Advantageously, the heating of step b) can be carried out by using:

in said internal mixer a shear rate of said reaction mixture in the internal mixer of at least 80 $s^{-1}$, preferably of at least 150 $s^{-1}$, for example performed at a speed of rotation of the rotor blades in the internal mixer of between 10 and 200 rpm, and preferably of between 50 and 120 rpm, and/or a jacket in the internal mixer which receives a heat transfer fluid, and/or employing a degree of filling of the internal mixer of greater than 100%; or by using in said screw extruder, heating elements with which the extruder is equipped.

It will be noted that such a shear rate (for example of between 100 and 200 $s^{-1}$) can be used in a tangential internal mixer (e.g. of Banbury type) or an intermeshing internal mixer (of Haake type).

It will also be noted that a rotation speed of 200 rpm can in particular be used for a Haake mixer, whereas a rotation speed of the order of 100 rpm can instead be used for a 3.6 L Shaw mixer.

It will also be noted that the performance of steps a) and b) in a screw extruder, e.g. a "ZSE 27 MAXX" twin-screw extruder manufactured by Leistritz, may be such that a maximum compounding temperature Ta of at least 200° C. is achieved during the heating of a mixture based on an EPDM and on an aliphatic polyolefin (e.g. a polypropylene), via electric heating elements with which the extruder has been provided, and that this temperature Ta is maintained for a time for example of greater than 30 seconds.

BRIEF DESCRIPTION OF THE DRAWINGS

Other features, advantages and details of the present invention will emerge on reading the following description of several exemplary embodiments of the invention, given by way of illustration and without limitation, in connection with the appended drawings, among which:

FIG. 1 is a scanning electron microscope (hereinafter SEM) photograph of a crosslinked composition I1 according to the invention based on an elastomer matrix of EPDM type.

FIG. 2 is an SEM photograph of another crosslinked composition I2 according to the invention based on the same elastomer matrix of EPDM type.

FIG. 3 is an SEM photograph of another crosslinked composition I3 according to the invention based on the same elastomer matrix of EPDM type.

FIG. 4 is an SEM photograph of another crosslinked composition I4 according to the invention based on the same elastomer matrix of EPDM type.

FIG. 5 is an SEM photograph of another crosslinked composition I5 according to the invention based on the same elastomer matrix of EPDM type.

FIG. 6 is an SEM photograph of another crosslinked composition I6 according to the invention based on the same elastomer matrix of EPDM type.

FIG. 7 is a stress-strain graph of the crosslinked compositions I1 to I6 according to the invention.

FIG. 8 is an SEM photograph of another crosslinked composition I7 according to the invention based on another elastomer matrix of EPDM type.

FIG. 9 is an SEM photograph of another crosslinked composition I8 according to the invention based on another elastomer matrix of EPDM type.

FIG. 10 is an SEM photograph of another crosslinked composition I9 according to the invention based on another elastomer matrix of EPDM type.

FIG. 11 is an SEM photograph of a crosslinked control composition C1 based on another elastomer matrix of EPDM type.

FIG. 12 is an SEM photograph of another crosslinked composition I10 according to the invention based on another elastomer matrix of EPDM type.

FIG. 13 is an SEM photograph of another crosslinked composition I11 according to the invention based on another elastomer matrix of EPDM type.

FIG. 14 is a stress-strain graph of the crosslinked compositions I17 to I11 according to the invention.

FIG. 15 is an SEM photograph of another crosslinked composition I13 according to the invention based on an elastomer matrix of EPDM type.

FIG. 16 is an SEM photograph of another crosslinked composition I15 according to the invention based on an elastomer matrix of EPDM type.

FIG. 17 is an SEM photograph of another crosslinked composition according to the invention 115' based on an elastomer matrix of EPDM type.

FIG. 18 is a Shore A hardness-polypropylene (PP) content graph for crosslinked compositions I8, I12, I13, I14, I15 and I15' according to the invention based on an EPDM elastomer matrix.

FIG. 19 is a stress-strain graph for the crosslinked compositions I12 to I15' according to the invention.

FIG. 20 is a stress-strain graph for the crosslinked composition I13 according to the invention and another control composition C3 based on an EPDM elastomer matrix.

FIG. 21 is a stress-strain graph for the crosslinked composition I16 according to the invention and another control composition C4, both based on an EPDM elastomer matrix.

FIG. 22 is a bar graph showing the results of a UV radiation resistance test for the crosslinked composition I16 according to the invention and the control composition C4.

FIG. 23 is a Shore A hardness-polypropylene (PP) content graph for crosslinked compositions I19,120 and 121 according to the invention and control C7, all based on a natural rubber (NR) elastomer matrix.

FIG. 24 is an SEM photograph of another crosslinked composition I26 according to the invention based on another elastomer matrix made from silicone rubber.

EXEMPLARY EMBODIMENTS OF THE INVENTION

In the examples concerned below, the crosslinkable control compositions based on EPDM and filled with carbon black were prepared by performing the following successive steps on a Haake® Polylab intermeshing internal mixer.

Filling:
- t=0 min
- material: EPDM
- speed: 50 rpm
- $T_{regulation}$=40° C.

Plasticizing:
- $t_{total}$=2 min
- material: —
- speed: 50 rpm
- $T_{regulation}$=40° C.

Filling:
- $t_{total}$=4 min
- material: filler+additives
- speed: 50 rpm
- $T_{regulation}$=40° C.

Compounding:
- $t_{total}$=6 min
- material: —
- speed: 50 rpm
- $T_{self\text{-}heating}$=100° C.

Discharge of Mixture and Cooling:
- $T_{discharged\ mixture}$=85° C.
- $T_{cooled\ mixture}$=30° C.

Acceleration on Mill:
- Day D
- T=40° C.

Vulcanization:
- t=10 min
- T=177° C.

Post-Curing:
- t=4 hours
- T=175° C.

In the examples concerned below, the crosslinkable compositions according to the invention based on EPDM and filled with polypropylene (PP) nodules were prepared by performing the following successive steps on a Haake® Polylab intermeshing internal mixer.

Filling:
- t=0 min
- material: EPDM
- speed: 5 rpm
- $T_{regulation}$=80° C.

Plasticizing:
- $t_{total}$=2 min
- material: —
- speed: 200 rpm
- $T_{regulation}$=80° C.

Filling:
- $t_{total}$=4 min
- material: PP+oil
- speed: 5 rpm
- $T_{regulation}$=80° C.

Compounding:
- $t_{total}$=11 min
- material: —
- speed: 200 rpm
- $T_{self\text{-}heating}$=175° C.

Stabilization of Self-Heating Temperature:
- t+2 min 30 seconds
- material: —
- $T_{material}$=175° C.
- T (° C.): function of the rotation speed.

Discharge of Mixture and Cooling:
- $T_{discharged\ mixture}$=160° C.
- $T_{cooled\ mixture}$=30° C.

Acceleration on Mill:
- Day D
- T=40° C.

Vulcanization:
- $t=t_{95}$
- T=180° C.

It will be noted that this process according to the invention, following the regulation temperature of 80° C., in the example of an EPDM matrix and a PP dispersed phase, uses a self-heating temperature of 175° C., maintained for the stabilization time of 2 min and 30 seconds.

Standards and Protocols Followed for Tests on the Crosslinkable and Crosslinked Compositions Obtained:

Standardized Measurements:

MDR (moving die rheometer): ISO 6502: 2016

Shore A hardness: ASTM D 2240

Tension: ASTM D 412

Mooney viscosity: ISO 289-1

Scorch: ISO 289-2

Comp. set (compression set): ISO 815 plot B

Delft tear ISO 34-2

UV resistance: PSA D27 1389/—G (2007)

Volume resistivity: IEC 62631 3-1.

SEM: Zeiss scanning electron microscopy coupled with an X-ray photon detector (SEM/EDX), with gold/palladium metallization. The microscope settings are mentioned on each photograph (WD for "working distance"; EHT for "electron high tension"; Type 2 ES2 secondary electron detector; and the dimension of the diaphragm).

RPA Rubber Process Analyzer:

Frequency Sweep

1. Crosslinking:

Temperature: 177° C. (+/−0.5° C.)

Frequency 0.002 Hz

Angle: 0.5 Deg

2. Frequency Sweep:

Temperature: 100.0° C.

Angle: 0.5 Deg

Frequency: 0.100 Hz; 0.300 Hz; 1.000 Hz; 3.000 Hz; 10.000 Hz; 30.000 Hz 5 points per condition.

Strain Sweep

1. Crosslinking

Temperature: 177° C. (+/−0.5° C.)

Frequency: 1.7 Hz

Angle: 0.5 Deg

2. Strain Sweep:

Temperature: 100.0° C.

Frequency: 1.7 Hz

Angle: 0.5%, 0.7%, 1.0%, 2.0%, 4.0%, 6.0%, 8.0%, 10.0%, 20.0%, 40.0%, 60.0%

5 points per condition.

Dynamic Mechanical Analysis ("DMA") tests:

The ISO 4664 standard was followed using Metravib® viscosity analyzer tests:

Conditions: −10%+/−0.1% at 155 Hz and −10%+/−2% at 15 Hz

Test specimen: Metravib® type blocks

Number of test specimens: 3 per condition

Measurement temperature: 23° C.

Lubricant: silicone oil spray.

First Series of Tests on Compositions with EPDM Matrices and PP Dispersed Phases:

EPDMs were used having variable molar masses and variable Mooney viscosities (ML(1+4) varying for example from 20 to 85) and with likewise variable mass contents of ethylene (C2), of propylene (C3), of diene and of oil.

Table 1 below lists the formulation common to compositions I1, I2, I3, I4, I5 and I6 of the invention.

TABLE 1

| Ingredients | Density | Compositions I1 to I6 |
|---|---|---|
| Keltan 5470 | 0.86 | 80 |
| Vistalon 3666 | 0.86 | 33 |
| PPH 3060 | 0.90 | 35 |
| Spheron SOA (carbon black) | 1.82 | |
| Torilis 7200 | 0.90 | 40 |
| PEG | 1.12 | 1.72 |
| stearic acid | 0.85 | 0.76 |
| ZnO | 3.70 | 3.10 |
| Vulcanization accelerators | | 3.08 |
| sulfur | | 1.89 |
| TOTAL (phr) | | 198.60 |

Table 2 below lists the essential conditions of the process for preparing the crosslinkable compositions which distinguish compositions I1 to I6 (self-heating temperature and the holding time thereof).

TABLE 2

| | I1 | I2 | I3 | I4 | I5 | I6 |
|---|---|---|---|---|---|---|
| Holding time (min) | 0.5 | 4.5 | 2.5 | 0.5 | 4.5 | 2.5 |
| Self-heating temperature (° C.) | 185 | 185 | 175 | 165 | 165 | 175 |

Regardless of the compounding conditions under these conditions, the crosslinked compositions I1 to I6 all exhibit a PP phase homogeneously dispersed in the EPDM matrix. The particle sizes measured by SEM are given in table 3 below.

TABLE 3

| | Particle size |
|---|---|
| I1 | From 350 nm to 1.2 μm |
| I2 | From 500 to 800 nm |
| I3 | From 400 nm to 1.1 μm |
| I4 | From 350 nm to 1.0 μm |
| I5 | From 500 nm to 1.1 μm |
| I6 | From 600 nm to 950 nm |

The morphologies of the crosslinked compositions I1 to I6 that can be seen in FIGS. 1-6 and the filler-matrix interactions make it possible to obtain very good reinforcement, as is shown by the tensile tests according to the standard ASTM D412 performed on the crosslinked compositions I1 to I6, the results of which can be seen in FIG. 7.

Table 4 below details the formulation common to the compositions I7, I8, I9, I10 and I11 according to the invention and to the control composition C1.

TABLE 4

| Ingredients | Density | Compositions I7-I11 and C1 |
|---|---|---|
| EPDM (variable) | 0.86 | 100 |
| PPH 3060 | 0.90 | 25 |
| Torilis 7200 | 0.90 | 40 |
| PEG | 1.12 | 1.72 |
| stearic acid | 0.85 | 0.76 |
| ZnO | 3.70 | 3.10 |
| Accelerators | | 3.08 |
| sulfur | | 1.89 |
| TOTAL (phr) | | 175.60 |

Table 5 below details the EPDMs used as elastomer matrices of compositions I7-I11 and C1.

TABLE 5

| Compositions EPDM grade (Commercial data) | | I7 NORDEL 4520 | I8 NORDEL IP 4570 | I9 NORDEL 4725P | C1 NORDEL 4820 | I10 Keltan 5470 | I11 NORDEL IP 4785 |
|---|---|---|---|---|---|---|---|
| Viscosity ML(1 + 4) | MU | 20 | 70 | 25 | 25 | 55 | 85 |
| C2% | % | 50 | 50 | 70 | 85 | 66 | 68 |
| Tg | ° C. | −45 | −43 | −37 | −16 | −37 | −41 |

Table 6 below provides comments concerning the morphologies of the crosslinked compositions I7 to I11 which can be seen in FIGS. 8, 9, 10, 12 and 13 and of the control composition C1 which can be seen in FIG. 11.

TABLE 6

| Compositions | Comments | PP particle size |
|---|---|---|
| I7 | Homogeneous distribution of PP particles | 150 nm to 900 nm |
| I8 | Homogeneous distribution of PP particles | 200 nm to 600 nm |
| I9 | Homogeneous distribution of PP particles | 200 nm to 750 nm |
| C1 | Heterogeneous distribution | PP possibly melted, no particles |
| I10 | Homogeneous distribution of PP particles | 300 nm to 900 nm |
| I11 | Homogeneous distribution of PP particles | 250 nm to 550 nm |

Apart from composition C1, with a very high content of ethylene (85%) in the EPDM, the desired morphology is obtained for the dispersed nodules.

It has not been successful to accelerate composition C1 on mills, it being specified that this very high content of ethylene in the EPDM of composition C1 appears to induce a bi-continuous morphology. The elastomeric character is lost in composition C1.

In the case of the modular morphologies obtained for compositions I7 to I11 of the invention, the crosslinking system was added to the open mill and then these compositions I7-I11 were crosslinked. As can be seen in FIG. 14, these compositions I7-I11 have good mechanical properties, in particular a reinforcement suitable for industrial application.

Table 7 below details the properties obtained for these crosslinked compositions I7 to I11 according to the invention.

TABLE 7

| Compositions | | I7 | I8 | I9 | C1 | I10 | I11 |
|---|---|---|---|---|---|---|---|
| Properties in the initial state | | | | | | | |
| Shore A hardness | (Point) | 55 | 60 | 68 | | 63 | 62 |
| 25% modulus | (MPa) | 1.2 | 1.3 | 1.9 | | 1.5 | 1.5 |
| 50% modulus | (MPa) | 1.7 | 1.7 | 2.4 | | 2.0 | 2.0 |
| 100% modulus | (MPa) | 2.3 | 2.4 | 3.0 | | 2.6 | 2.6 |
| 300% modulus | (MPa) | 4.9 | 4.8 | 5.3 | | 4.7 | 5.0 |
| M300/M100 | | 2.1 | 2.0 | 1.8 | | 1.8 | 1.9 |
| Breaking stress | (MPa) | 5.1 | 4.9 | 12.7 | | 8.9 | 7.8 |
| Elongation at break | (%) | 313 | 294 | 517 | | 489 | 425 |
| Delft tear | N | 20.0 | 24.0 | 31.0 | | 27.0 | 27.0 |
| AIR aging 168 h at 70° C. | | | | | | | |
| Shore A hardness | (Point) | 56 | 60 | 67 | | 63 | 63 |
| Hardness variation | | 1.0 | 0.0 | −1.0 | | 0.0 | 1.0 |
| 25% modulus | (MPa) | 1.4 | 1.4 | 2.0 | | 1.6 | 1.6 |
| 50% modulus | (MPa) | 1.9 | 1.8 | 2.6 | | 2.1 | 2.1 |
| 100% modulus | (MPa) | 2.70 | 2.50 | 3.30 | | 2.70 | 2.80 |
| 300% modulus | (MPa) | 5.10 | | 6.80 | | 5.60 | 6.30 |
| Breaking stress BS | (MPa) | 6.20 | 5.50 | 12.30 | | 8.10 | 8.20 |
| Elongation at break EB | % | 305.0 | 275.0 | 425.0 | | 409.0 | 370.0 |
| Variation in BS | | 22% | 12% | −3% | | −9% | 5% |
| Variation in EB | | −3% | −6% | −18% | | −16% | −13% |
| Properties in the vulcanized state | | | | | | | |
| Comp. set 168 h at 70° C. | (%) | 52 | 46 | 61 | | 48 | 44 |

Table 8 below details the results obtained in terms of dynamic properties for composition I8 alone:

TABLE 8

| RPA frequency sweep (100° C.) for I8 | |
|---|---|
| G* (0.3 Hz) in kPa | 1155 |
| G* (3 Hz) in kPa | 12.2 |
| G* (30 Hz) in kPa | 1295.0 |
| tan δ (3 Hz) | 1.121 |
| RPA strain sweep (100° C.) for I8 | |
| G* 0.5% in kPa | 1191 |
| G* 20% in kPa | 982 |
| Ratio G* 0.5%/G* 20% (Payne effect) | 1.21 |
| tan δ (0.5%) | 0.047 |

Table 9 below details a formulation common to composition I8 and to other compositions I12, I13, I14, I15 and I15' according to the invention.

TABLE 9

| | Density | |
|---|---|---|
| Nordel IP 4570 | 0.86 | 100 |
| PPH 3060 | 0.9 | Variable |
| Torilis 7200 | 0.9 | 40 |
| PEG | 1.12 | 1.72 |
| stearic acid | 0.85 | 0.76 |
| ZnO | 3.7 | 3.1 |
| Accelerators | | 3.08 |
| sulfur | | 1.89 |
| TOTAL (phr) | | 175.60 |

The polypropylene PPH 3060 tested was in accordance with table 10 below.

TABLE 10

| | PPH 3060 |
|---|---|
| Density (ISO 1183) | 0.905 |
| Melting point (ISO 3146) | 165° C. |
| Melt flow index (2.16 kg-230° C.)g/10 min | 1.8 |
| Flexural modulus (MPa) | 1300 |
| Izod 23° C. (kJ/m$^2$) | 6 |

Compositions I8 and I12 to I15' were in accordance with table 11 below.

TABLE 11

| | I8 | I12 | I13 | I14 | I15 | I15' |
|---|---|---|---|---|---|---|
| PP content (phr) | 25 | 35 | 45 | 55 | 65 | 75 |

As can be seen in FIGS. 15 to 17, the morphology obtained is similar for all the compositions I8 and I12 to I15', with the PP dispersed in the form of nodules of the order of one μm in the EPDM matrix.

Table 12 below details the mechanical and effective reinforcement properties obtained for these crosslinked compositions I8 and I12-I15'. In particular, FIG. 18 illustrates the variation in Shore Ahardness of these compositions with the content of PP in phr.

TABLE 12

| | | I8 | I12 | I13 | I14 | I15 | I15' |
|---|---|---|---|---|---|---|---|
| PPH 3060 (in phr) | | 25 | 35 | 45 | 55 | 65 | 75 |
| Properties in the initial state | | | | | | | |
| Shore A hardness | (Point) | 60 | 63 | 71 | 74 | 80 | 82 |
| 50% modulus | (MPa) | 1.7 | 2.0 | 2.6 | 3.4 | 4.3 | 5.3 |
| 100% modulus | (MPa) | 2.4 | 2.8 | 3.5 | 4.5 | 5.5 | 6.4 |
| 300% modulus | (MPa) | 4.8 | 5.9 | 6.8 | 7.9 | 8.8 | 9.4 |
| M300/M100 | | 2.0 | 2.1 | 1.9 | 1.8 | 1.6 | 1.5 |
| Breaking stress | (MPa) | 4.9 | 14.0 | 14.2 | 23.1 | 13.3 | 16.8 |
| Elongation at break | % | 294 | 563 | 542 | 684 | 480 | 544 |
| Delft tear | N | 2475 | 34.6 | 4075 | 53.3 | 53.2 | 59.2 |
| AIR aging 168 h at 70° C. | | | | | | | |
| Shore A hardness | (Point) | 60 | 65 | 73 | 75 | 60 | 65 |
| Variation Hardness | | 0 | 2 | 2 | 1 | 0 | 2 |
| 50% modulus | (MPa) | 1.8 | 2.4 | 2.9 | 3.7 | 1.8 | 2.4 |
| 100% modulus | (MPa) | 2.50 | 3.4 | 4.1 | 4.9 | 2.50 | 3.4 |
| 300% modulus | (MPa) | | 7.5 | 8.5 | 9.7 | | 7.5 |
| Breaking stress BS | (MPa) | 5.50 | 13.1 | 15.5 | 19.9 | 5.50 | 13.1 |
| Elongation at break EB | % | 275.0 | 438.0 | 453.0 | 481.0 | 275.0 | 438.0 |
| Variation in BS | | 12% | −0.90 | 1.30 | −3.20 | 12% | −0.90 |
| Variation in EB | | −6% | −125 | −89 | −203 | −6% | −125 |
| Comp. set 168 h at 70° C. | (%) | 46 | 47 | 48 | 56 | unknown | unknown |

FIG. 19 illustrates the satisfactory reinforcing properties obtained for these compositions I12 to I15'.

Table 13 below details the formulation of a control composition C3 (with an EPDM matrix), comparing it to the formulation of abovementioned composition I13 according to the invention, both of these compositions having the same Shore A hardness.

TABLE 13

| Ingredients | Density | C3 | I13 |
|---|---|---|---|
| NORDEL IP | 0.86 | 100 | 100 |
| PPH 3060 | 0.90 | / | 45 |
| Torilis 7200 | 0.90 | 40 | 40 |

TABLE 13-continued

| Ingredients | Density | C3 | I13 |
|---|---|---|---|
| PEG 4000 | 1.12 | 1.72 | 1.72 |
| stearic acid | 0.85 | 0.76 | 0.76 |
| ZnO | 3.70 | 3.10 | 3.10 |
| Spheron SOA | 1.82 | 90 | / |
| Accelerators | | 3.08 | 3.08 |
| S | | 1.89 | 1.89 |
| TOTAL (phr) | | 240.60 | 195.60 |

As shown in table 14 below of properties in the cross-linkable and crosslinked state, a reduction in the density of 18%, an increase in the scorch time, an improvement in the properties at break and a reduction in the mechanical non-linearities in strain sweep (Payne effect) and frequency sweep are observed for composition I13 compared to control composition C3.

TABLE 14

| | | C3 | I13 |
|---|---|---|---|
| Density | | 1.10 | 0.89 |
| Rheological properties 177° C. 10 min | | | |
| C min | | 2.04 | 0.41 |
| Cmax | | 23.03 | 3.95 |
| Delta C | | 20.99 | 3.54 |
| Ts2 | | | 2.32 |
| t05 | | 0.68 | 1.10 |
| t 90 | | 5.45 | 6.47 |
| t95 | | 7.06 | 9.07 |
| Scorch 125° C. | | | |
| Min. torque | M: s | 67.2 | 62.7 |
| t5 | min | 11.17 | 20.09 |
| t35 | min | 16.22 | 24.52 |
| RPA dynamic properties<br>RPA frequency sweep (100° C.) | | | |
| G* (0.3 Hz) | (kPa) | 2126 | 1907 |
| G* (3 Hz) | (kPa) | 2185.6 | 2044.8 |
| G* (30 Hz) | (kPa) | 2277.5 | 2197.8 |
| G* 30/G*0.3 | | 1.071 | 1.152 |
| tan El (3 Hz) | | 0.115 | 0.069 |
| RPA Payne effect 177° C. (100° C.) | | | |
| G* 0.5% | (kPa) | 3885.8 | 2455.6 |
| G* 20% | (kPa) | 1835.9 | 1672.2 |
| Ratio G* 0.5% / G* 20% | | 2.12 | 1.47 |
| Properties in the vulcanized state<br>Properties in the initial state | | | |
| Shore A hardness | (Point) | 70 | 71 |
| Instantaneous Shore A | (Point) | 71 | / |
| 100% modulus | (MPa) | 6.2 | 3.5 |
| 200% modulus | (MPa) | 13.5 | / |
| 300% modulus | (MPa) | | 6.8 |
| Breaking stress | (MPa) | 15.6 | 14.2 |
| Elongation at break | % | 246 | 542 |
| Delft tear | N | 37.3 | 40.6 |
| DMA analysis | | | |
| 15 Hz modulus (MPa) | | 11.8 | 17.50 |
| Tan D 15Hz | | 0.210 | 0.2 |
| 155 Hz modulus (MPa) | | 22.1 | 25.2 |
| M155/M15 Hz | | 1.87 | 1.44 |
| After AIR aging 7 days at 70° C. | | | |
| Shore A hardness | (Point) | 70 | 73 |
| Hardness variation | | 0 | 2 |
| 100% modulus | (MPa) | 6.2 | 4.1 |
| 200% modulus | (MPa) | 13.4 | / |
| 300% modulus | (MPa) | – | 8.5 |
| Breaking stress | (MPa) | 15.3 | 15.5 |
| Elongation at break | % | 235 | 453.0 |

TABLE 14-continued

| | C3 | I13 |
|---|---|---|
| Variation in break. stress | −2 % | −9 % |
| Variation in elong. at break | −4 % | 16 % |

Figure 20:
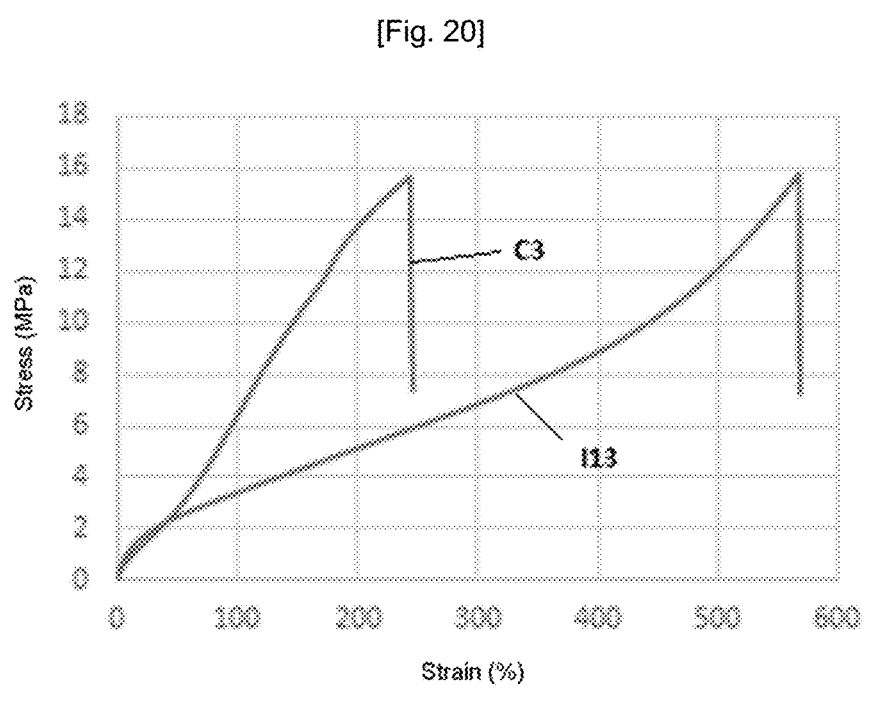

FIG. 20 compares the tensile curves of compositions I13 and C3, showing the superior reinforcement of composition I13.

Table 15 below compares the dynamic properties of this same composition I13 to those of another control composition C5, still based on and EPDM matrix.

TABLE 15

| | C5 | 113 |
|---|---|---|
| NORDEL IP 4570 | 100 | 100 |
| N550 | 95 | |
| PPH | 3060 | 45 |
| Torilis 7200 | 40 | 40 |
| PEG | 1.72 | 1.72 |
| stearic acid | 0.76 | 0.76 |
| ZnO | 3.10 | 3.10 |
| Accelerators | 3.08 | 3.08 |
| sulfur | 1.89 | 1.89 |
| TOTAL (phr) | 235.60 | 195.60 |

Table 16 below details these advantageous dynamic properties of composition I13 (see in particular tan D and ratio M155/M15 Hz), measured on Metravib.

TABLE 16

| DMA | C5 | 113 |
|---|---|---|
| 15 Hz modulus (MPa) | 13.0 | 17.5 |
| Tan D 15 Hz | 0.227 | 0.150 |
| 155 Hz modulus (MPa) | 26.2 | 25.2 |
| M155/M15 Hz | 2.02 | 1.44 |

Table 17 below details the formulations of another composition I16 according to the invention compared to a control composition C4, still based on an EPDM matrix. These formulations are more particularly suitable for motor vehicle bodywork seals, and compositions I16 and C4 have similar hardnesses.

TABLE 17

| Ingredients | C4 | 116 |
|---|---|---|
| Keltan 5470 | 80.76 | 80.76 |
| Vistalon 3666 | 33.68 | 33.68 |
| Spheron SOA | 129.21 | 5 |
| PPH 3060 | 30 | |
| Torilis 7200 | 74.57 | 40 |
| BSH chalk | 57.04 | 57.04 |
| kezadol gr | 10.31 | 10.31 |
| PEG 4000 | 1.72 | |
| stearic acid | 0.76 | 0.76 |
| ZnO | 3.10 | 3.10 |
| Accelerators | 3.08 | 3.08 |
| S | 1.89 | 1.89 |
| Vulkalent E80 | 0.15 | 0.15 |
| TOTAL (phr) | 396.30 | 265.80 |

Composition I16 contains 5 phr of carbon black to guarantee the black color and be representative during the UV resistance tests. The morphology was not observable due to the very high content of fillers (especially of clear fillers).

As shown in table 18 below, the following advantageous results were obtained for composition I16 compared to the control composition C4:

- decrease in density (−12%)
- no scorch,
- similar reinforcement (similar moduli), but very markedly improved breaking strength,
- very good mechanical properties after aging,
- compression set reduced by 10 to 20 points,
- less pronounced discoloration after C14000 UV aging, and
- very low conductivity.

TABLE 18

| | C4 | 116 |
|---|---|---|
| Density | 1.23 | 1.09 |
| MDR rheological properties 177° C. 10 min | | |
| C min | 1.51 | 0.41 |
| C max | 12.59 | 5.14 |
| Delta C | 11.08 | 4.73 |
| Ts2 | 1.04 | 3.25 |
| t 05 | 0.79 | 2.44 |
| t 90 | 3.05 | 5.78 |
| t 95 | 3.73 | 6.63 |
| Scorch 125° C. | | |
| Min. torque (m: s) | 45.9 | 48.9 |
| t5 (min) | 14:06 | — |
| t35 (min) | 20:35 | — |
| Properties in the vulcanized state | | |
| Shore hardness | 65 | 64 |
| 50% modulus (MPa) | 1.4 | 1.4 |
| 100% modulus (MPa) | 2.0 | 1.8 |
| 300% modulus (MPa) | 4.8 | 3.2 |
| M300/M100 | 2.4 | 1.8 |
| Breaking stress (MPa) | 7.2 | 17.8 |
| Elongation at break (%) | 633 | 733 |
| AIR aging 2 weeks at 125° C. | | |
| Shore A hardness | 65 | 65 |
| Hardness variation | 0 | +1 |
| 50% modulus (MPa) | 1.6 | 1.7 |
| 100% modulus (MPa) | 2.4 | 2.1 |
| 300% modulus (MPa) | 5.8 | 4.3 |
| Breaking stress (MPa) | 8.3 | 19.8 |
| Elongation at break (%) | 563.0 | 640.0 |
| Comp. set (%) | | |
| 168h 70° C. | 86 | 66 |
| 22 h 23° C. | 33 | 21 |
| 22 h100° C. | 92 | 73 |
| Resistivity | | |
| Volume resistivity (IEC 62631 3-1) (0.cm) | $7.9 \times 10^{1}$ | $1.67 \times 10^{15}$ |

FIG. 21 shows the superiority of the composition I16 compared to C4 for reinforcement, and FIG. 22 for the UV resistance (test carded out according to the standard PSA D27 1389/—G (2007)).

Table 19 below lists the data obtained after 5 cycles of UV exposure.

TABLE 19

| | | C4 | 116 |
|---|---|---|---|
| Initial | L | 13.00 | 8.69 |
| | a | −0.13 | 0.38 |
| | b | −1.07 | −0.11 |
| | DL | 12.38 | 10.63 |
| | Da | 0.02 | 0.20 |
| | Db | 0.80 | 0.86 |
| | DE | 12.41 | 10.67 |
| 5 cycles | Gray scale | 3 | 3 |

Second Series of Tests on Compositions with NR Matrices and PP Dispersed Phases:

Table 20 below details the formulations of two compositions according to the invention I17 and I18 compared to a control composition C6, all based on natural rubber as elastomer matrix.

TABLE 20

| | C6 | I17 | I18 |
|---|---|---|---|
| PPH 3060 | | 20 | 40 |
| N772 | 40 | | |
| NR | 100 | 100 | 100 |
| Processing agents | 4 | 4 | 4 |
| ZnO | 10 | 10 | 10 |
| Stearic acid | 2 | 2 | 2 |
| Antioxidants | 5 | 5 | 5 |
| Accelerators | 4.2 | 4.2 | 4.2 |
| Sulfur | 1.1 | 1.1 | 1.1 |
| TOTAL (phr) | | 146.3 | 166.3 |

As shown in table 21 below, the compositions I17-I18 exhibit greater reinforcement, very high moduli at low strain and an improved aging resistance compared to the composition C6.

TABLE 21

| | | C6 | 117 | 118 |
|---|---|---|---|---|
| Properties in the initial state | | | | |
| Shore A hardness | (Point) | 49.0 | 64 | 78 |
| 100% modulus | (MPa) | 2.0 | 7.8 | 23.8 |
| 200% modulus | (MPa) | 5.4 | 11.9 | — |
| 300% modulus | (MPa) | 10.6 | 15.4 | — |
| Breaking stress | (MPa) | 25.8 | 19.0 | 23.1 |
| Elongation at break | % | 507 | 360 | 104 |
| Delft tear | N | | | |
| AIR aging 14 days at 100° C. | | | | |
| | | 58 | 70 | 81 |
| Shore A hardness | (Point) | 9 | 6 | 4 |
| Hardness | variation | 4 | 9.7 | — |
| 100% modulus | (MPa) | 10 | — | — |
| 200% modulus | (MPa) | — | — | |
| 300% modulus | (MPa) | 11.8 | 11.5 | 20.7 |
| Breaking stress | (MPa) | 222 | 131 | 64 |
| Elongation at break | % | −42% | −39% | −10% |
| Variation in break. stress | −44% | −64% | −38% | |

Table 22 below details a formulation common to three other compositions according to the invention, I19, I20 and I21, based on NR, compared to one other control composition C7, also based on NR.

TABLE 22

| | Compositions C7, I19-I21 |
|---|---|
| PPH 3060 | variable |
| N772 | |
| NR | 100 |

TABLE 22-continued

| | Compositions C7, I19-I21 |
|---|---|
| Processing agents | 4 |
| ZnO | 10 |
| Stearic acid | 2 |
| Antioxidants | 5 |
| Accelerators | 4.20 |
| Sulfur | 1.10 |
| TOTAL (phr) | 146.30 |

Table 23 below details the mechanical properties obtained.

TABLE 23

| | Density | C7 | I19 | I20 | I21 |
|---|---|---|---|---|---|
| PPH 3060 | 0.86 | 0 | 5 | 10 | 20 |
| | Properties in the initial state | | | | |
| Shore A hardness | (Point) | 37 | 47 | 60 | 68 |
| 100% modulus | (MPa) | 0.8 | 1.6 | 3.3 | 5.0 |
| 200% modulus | (MPa) | 1.3 | 2.7 | 5.2 | 8.4 |
| 300% modulus | (MPa) | 2.0 | 4.1 | 7.2 | 11.8 |
| Breaking stress | (MPa) | >7 | >13 | >16 | >13 |
| Elongation at break | % | >523 | >485 | >484 | >319 |
| Delft tear | N | | | | |
| | DMA | | | | |
| 15 Hz modulus (MPa) | | 2.11 | 3.05 | 4.81 | 8.98 |
| Tan D 15 Hz | | 0.031 | 0.053 | 0.760 | 0.107 |
| 155 Hz modulus | | 2.27 | 3.50 | 5.78 | 11.70 |
| M155/M15 Hz | | 1.08 | 1.15 | 1.20 | 1.30 |

This table 23 shows that it is possible to adjust the level of reinforcement for compositions I19-I21 by modifying the content of PP dispersed in the NR, and FIG. 23 shows the change in the Shore A hardness of these compositions I19-I21 compared to composition C7.

Third Series of Tests on Compositions with Silicone Rubber Matrices and Dispersed Phases of Phenyl Silicone Resin:

Six compositions according to the invention, I22, I23, I24, I25, I26 and I27, were tested in comparison with a control composition C8, all based on a PDMS as silicone rubber and comprising a dispersed phenyl silicone thermoplastic resin with the exception of composition C8. Compositions I22 to I27 comprised:

- 100 phr of Momentive SilPlus70HS (polydimethylsiloxane) silicone rubber base
- a phenyl resin with a softening point of 60-70° C. (BELSIL@ SPR 45 VP from Wacker), and
- 1 phr of a peroxide DBPH (2,5-dimethyl-2,5-bis(tert-butylperoxy)hexane).

The morphology obtained for these compositions I22 to I27 was composed of a PDMS matrix containing nodules of this resin of the order of a micrometer (see the photograph of FIG. 24 relating to composition I26 with 50 phr of resin).

As shown in table 24 below, irrespective of the concentration of resin, the PDMS matrix of compositions I22 to I27 is reinforced satisfactorily.

TABLE 24

| | Resin content (phr) | Shore A hardness | M 100% | Breaking stress (MPa) | Elongation at break (c/o) |
|---|---|---|---|---|---|
| C8 | 0 | 61 | 1.9 | 9.0 | 930 |
| 122 | 5 | 65 | 2.0 | 7.2 | 770 |
| 123 | 10 | 73 | 2.4 | 6.8 | 720 |
| 124 | 20 | unknown | 2.8 | 5.5 | 600 |
| 125 | 30 | 77 | 3.3 | 4.2 | 400 |
| 126 | 50 | 81 | 3.5 | 3.8 | 220 |
| 127 | 70 | 82 | 3.7 | 3.8 | 150 |

As shown in table 25 below, relating to dynamic tests (DMA), in contrast to the conventional reinforcing fillers (silica in the case of silicones) the high level of reinforcement of composition I26 advantageously does not generate mechanical non-linearities (reduced Payne effect).

TABLE 25

| | 25° C. | | 60° C. | |
|---|---|---|---|---|
| | C8 | I26 | C8 | I26 |
| G' 0.1% | 15 | 32 | 11 | 20 |
| G' 8% | 5 | 12 | 5 | 11 |
| G' 0.1%/G' 8% | 3.0 | 2.7 | 2.2 | 1.8 |

The invention claimed is:

1. A crosslinkable rubber composition based on at least one elastomer, the composition comprising other ingredients which include a crosslinking system and a thermoplastic polymeric phase which has at least one melting temperature Tm and which is dispersed in said at least one elastomer in the form of nodules, the crosslinkable composition comprising the product:

a) of a melt reaction by thermomechanical working of a reaction mixture comprising said at least one elastomer and said other ingredients, with the exception of the crosslinking system, to obtain a precursor mixture of the crosslinkable composition, then b) of mechanical working of said precursor mixture with prior addition of the crosslinking system to obtain the crosslinkable composition, wherein:

the nodules have a weight-average greatest transverse dimension of between 150 nm and 3 μm, said reaction comprises heating of the reaction mixture up to a maximum compounding temperature Ta which is greater than the highest of said at least one melting temperature Tm of the thermoplastic polymeric phase and which is maintained for a holding time, the crosslinking system comprises sulfur when said at least one elastomer is unsaturated and said thermoplastic polymeric phase comprises saturated polymer chains, and comprises a peroxide when said at least one elastomer is saturated, when the crosslinking system comprises sulfur, said elastomer(s) is(are) an EPDM (Ethylene-Propylene-Diene Terpolymer) or natural rubber, and said thermoplastic polymeric phase is a polypropylene; and when the crosslinking system comprises a peroxide, said elastomer(s) is(are) a PDMS (Polydimethylsiloxanes), and said thermoplastic polymeric phase is a saturated polymer chosen from phenyl silicone resins:

the holding time of said maximum compounding temperature Ta is of between 1 minute and 5 minutes, and the crosslinkable rubber composition comprises, as a powdered filler dispersed in said at least one elastomer, from 0 to 10 phr of carbon black and from 0 to 60 phr of a non-reinforcing inorganic filler other than a silica (phr: parts by weight per 100 parts of elastomer(s)).

2. The crosslinkable composition as claimed in claim 1, in which the nodules have a weight-average greatest transverse dimension of between 100 nm and 10 μm.

3. The crosslinkable composition as claimed in claim 1, wherein the crosslinkable composition is free of powdered filler dispersed in said at least one elastomer.

4. The crosslinkable composition as claimed in claim 1, wherein the crosslinkable composition has a scorch resistance measured according to the standard ISO 289-2 via t5 and t35 times without premature crosslinking of the composition which are both greater than 17 minutes, t5 and t35 relating to Mooney viscosity increments ML(1+4) at 125° C. relative to the initial Mooney viscosity respectively of +5 and +35 points.

5. The crosslinkable composition as claimed in claim 1, wherein the crosslinking system comprises sulfur and optionally additionally a peroxide, said at least one elastomer being a rubber chosen from:

olefinic rubbers, including ethylene-alpha-olefin copolymers, and diene rubbers obtained at least in part from conjugated diene monomers, including natural rubber (NR), isoprene homopolymers and copolymers, and butadiene homopolymers and copolymers, and wherein said thermoplastic polymeric phase comprises at least one saturated polymer chosen from functionalized or non-functionalized aliphatic or aromatic polyolefins, including homopolymers or copolymers of ethylene or of propylene.

6. The crosslinkable composition as claimed in claim 5, wherein said at least one elastomer is an EPDM having a mass content of units derived from ethylene of between 15% and 80%, and said thermoplastic polymeric phase comprises at least one said aliphatic polyolefin chosen from ethylene homopolymers, propylene homopolymers and polypropylene-ethylene-diene terpolymers having a mass content of units derived from ethylene of between 1% and 15%.

7. The crosslinkable composition as claimed in claim 1, wherein the crosslinking system comprises a peroxide and optionally additionally sulfur, said at least one elastomer being saturated and said thermoplastic polymeric phase comprising saturated or unsaturated polymer chains, and wherein said at least one elastomer is a silicone rubber, and said thermoplastic polymeric phase comprises at least one saturated polymer chosen from phenyl silicone or alkyl silicone resins.

8. The crosslinkable composition as claimed in claim 1, wherein the crosslinkable composition comprises said thermoplastic polymeric phase in an amount of between 1 and 150 phr (phr: parts by weight per 100 parts of elastomer(s)), and wherein said nodules formed by said thermoplastic polymeric phase have said weight-average greatest transverse dimension of between 150 nm and 3 μm, said nodules being spherical or ellipsoidal.

9. A crosslinked rubber composition, wherein the crosslinked composition is the product of thermal crosslinking of the crosslinkable composition as claimed in claim 1 by chemical reaction with said crosslinking system.

10. The crosslinked composition as claimed in claim 9, wherein the crosslinked composition comprises, as a powdered filler dispersed in said at least one elastomer, from 0 to 10 phr of carbon black and from 0 to 60 phr of an inorganic filler other than a silica (phr: parts by weight per 100 parts of elastomer(s)).

11. The crosslinked composition as claimed in claim 10, wherein the crosslinked composition has:

a specific gravity of less than 1.10, and/or a volume resistivity, measured according to the standard IEC 62631 3-1, of greater than $10^{10}$ Ω·cm.

12. The crosslinked composition as claimed in claim 10, wherein the crosslinked composition has a Shore A hardness measured according to the standard ASTM D2240 and a ratio G' 0.5%/G' 20% of storage moduli G' relative to the complex shear moduli G* satisfying at least one of the following conditions (i) and (ii) at 100° C.:

(i) G' 0.5%/G' 20%≤1.50 if the Shore A hardness is from 40 to 50, ≤1.80 if the Shore A hardness is from 51 to 60, and ≤2.00 if the Shore A hardness is from 51 to 60, (ii) tan delta at 0.5% strain ≤0.080, G' 0.5% and G' 20% being measured at respective dynamic strain amplitudes of 0.5% and 20% on double shear test specimens crosslinked at 177° C. and subjected to a shear strain sweep of 0.5% to 60% at the same frequency of 1.7 Hz and the same temperature of 100° C., and tan delta representing the loss factor measured during said strain sweep.

13. The crosslinked composition as claimed in claim 10, wherein said at least one elastomer comprises an olefinic rubber and said thermoplastic polymeric phase comprises at least one aliphatic polyolefin, and wherein the crosslinked composition has a Shore A hardness measured according to the standard ASTM D2240 and a ratio G' 30 Hz/G' 0.3 Hz of storage moduli G' relative to the complex shear moduli G* and a loss factor tan delta satisfying at least one of the following conditions (i) and (ii) at 100° C.:

(i) G' 30 Hz/G' 0.3 Hz≤1.20 if the Shore A hardness is from 51 to 60 and ≤1.10 if the Shore A hardness is from 61 to 70, (ii) tan delta at 3 Hz≤0.80 if the Shore A hardness is from 51 to 60 and ≤0.10 if the Shore A hardness is from 61 to 70, G' 30 Hz and G' 0.3 Hz being measured at a dynamic strain amplitude of 0.5% on double shear test specimens crosslinked at 177° C. and subjected to a frequency sweep of 0.100 Hz to 30 000 Hz at the same temperature of 100° C., and tan delta being measured at 3 Hz during said frequency sweep.

14. The crosslinked composition as claimed in claim 10, wherein said at least one elastomer comprises an olefinic rubber, or a diene rubber derived at least in part from a conjugated diene monomer, wherein said thermoplastic polymeric phase comprises at least one aliphatic polyolefin, and wherein the crosslinked composition has a Shore A hardness measured according to the standard ASTM D2240 and a ratio of moduli M 155 Hz/M 15 Hz and a loss factor tan D at 15 Hz which are measured at 23° C. via a frequency sweep according to the standard ISO 4664 by a Metravib® viscosity analyzer on Metravib® block-type test specimens and which satisfy at least one of the conditions (i) and (ii):

(i) M 155 Hz/M 15 Hz≤1.50 if the Shore A hardness is from 40 to 50 and ≤2.00 if the Shore A hardness is from 61 to 70, (ii) tan D at 15 Hz≤0.10 if the Shore A hardness is from 40 to 50, ≤0.15 if the Shore A hardness is from 51 to 60, and <0.20 if the Shore A hardness is from 61 to 70.

15. The crosslinked composition as claimed in claim 10, wherein said at least one elastomer comprises an olefinic rubber and said thermoplastic polymeric phase comprises at least one aliphatic polyolefin, and wherein the crosslinked composition satisfies at least one of the following conditions (i) to (iii):

(i) an elongation at break, measured in uniaxial tension according to the standard ASTM D 412, of greater than 250%;

(ii) a breaking stress, measured in uniaxial tension according to the standard ASTM D 412, of greater than 4 MPa; and (iii) a Shore A hardness measured after 3 seconds according to the standard ASTM D2240 which is greater than 40.

16. The crosslinked composition as claimed in claim 10, wherein said at least one elastomer comprises a silicone rubber and said thermoplastic polymeric phase comprises at least one saturated polymer chosen from phenyl silicone or alkyl silicone resins, and wherein the crosslinked composition is completely free from said powdered filler.

17. The crosslinked composition as claimed in claim 10, wherein said at least one elastomer comprises a diene rubber derived at least in part from a conjugated diene monomer, and said thermoplastic polymeric phase comprises at least one aliphatic polyolefin, and wherein the crosslinked composition satisfies at least one of the following conditions (i) to (iii):

(i) at least one of the following secant moduli M100, M200 and M300, at 100%, 200% and 300% strain, respectively, measured in uniaxial tension according to the standard ASTM D 412:

M100 of greater than 3 MPa,

M200 of greater than 6 MPa,

M300 of greater than 11 MPa;

(ii) a breaking stress, measured in uniaxial tension according to the standard ASTM D 412, of greater than 13 MPa; and (iii) a Shore A hardness measured after 3 seconds according to the standard ASTM D2240 which is greater than 45.

18. A mechanical member having a dynamic function chosen in particular from anti-vibratory supports and elastic articulations for motorized vehicles or industrial devices, said member comprising at least one elastic part which is composed of a crosslinked rubber composition and which is suitable for being subjected to dynamic stresses, wherein said crosslinked composition is as claimed in claim 9.

19. A sealing element chosen in particular from seals for vehicle bodywork and sealing profiles for buildings, said sealing element comprising an elastic part which is composed of a crosslinked rubber composition, in which the crosslinked rubber composition is as claimed in claim 9.

20. A process for preparing a crosslinkable composition as claimed in claim 1, wherein the process comprises the following steps:

a) introduction, into an internal mixer or into a screw extruder, of said at least one elastomer and then said other ingredients, with the exception of said crosslinking system;

b) thermomechanical working in said internal mixer or in said screw extruder, comprising melt compounding of said reaction mixture with the exception of the crosslinking system to obtain a precursor mixture of the crosslinkable composition, step b) comprising b1) heating said reaction mixture up to said maximum compounding temperature Ta which is greater than the highest of said at least one melting temperature Tm of said thermoplastic polymeric phase; and b2) stabilizing said heating by maintaining said maximum compounding temperature Ta for said holding time of between 1 minute and 5 minutes;

c) removal of the mixture from said internal mixer or said screw extruder, and optionally cooling it; and then d) mechanical working of said precursor mixture with prior addition of said crosslinking system comprising sulfur and/or peroxide to obtain the crosslinkable composition wherein the crosslinking system comprises sulfur when said elastomer(s) is(are) unsaturated and said thermoplastic polymeric phase comprises saturated polymer chains, and comprises a peroxide when said elastomer(s) is(are) saturated, wherein when the crosslinking system comprises sulfur, said elastomer(s) is(are) an EPDM (Ethylene-Propylene-Diene Terpolymer) or natural rubber, and said thermoplastic polymeric phase is a polypropylene; and when the crosslinking system comprises a peroxide, said elastomer(s) is(are) a PDMS (Polydimethylsiloxanes), and said thermoplastic polymeric phase is a saturated polymer chosen from phenyl silicone resins.

21. The process for preparing a crosslinkable composition as claimed in claim 20, wherein the heating of step b) is carried out by using:

in said internal mixer:

a shear rate of said reaction mixture in the internal mixer of at least 80 $s^{-1}$, and/or a jacket in the internal mixer which receives a heat transfer fluid, and/or employing a degree of filling of the internal mixer of greater than 100%; or by using in said screw extruder, heating elements with which the extruder is equipped.

* * * * *